United States Patent
Carlson et al.

(10) Patent No.: US 11,707,721 B2
(45) Date of Patent: Jul. 25, 2023

(54) METHODS OF MAKING PERMEABLE AEROGELS

(71) Applicant: University of Utah Research Foundation, Salt Lake City, UT (US)

(72) Inventors: Krista Carlson, Salt Lake City, UT (US); Alexander Reifsnyder, Salt Lake Sity, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 126 days.

(21) Appl. No.: 16/755,810

(22) PCT Filed: Oct. 11, 2018

(86) PCT No.: PCT/US2018/055518
§ 371 (c)(1),
(2) Date: Apr. 13, 2020

(87) PCT Pub. No.: WO2019/075274
PCT Pub. Date: Apr. 18, 2019

(65) Prior Publication Data
US 2021/0394146 A1    Dec. 23, 2021

Related U.S. Application Data

(60) Provisional application No. 62/571,097, filed on Oct. 11, 2017.

(51) Int. Cl.
*B01J 13/00* (2006.01)
*C01B 33/157* (2006.01)
*C01B 33/158* (2006.01)

(52) U.S. Cl.
CPC ....... *B01J 13/0091* (2013.01); *B01J 13/0026* (2013.01); *B01J 13/0039* (2013.01); *C01B 33/157* (2013.01); *C01B 33/1585* (2013.01)

(58) Field of Classification Search
CPC ...... B01J 20/3057–3064; B01J 13/0021; B01J 13/0091; C01B 33/152–159
See application file for complete search history.

(56) References Cited

U.S. PATENT DOCUMENTS

| | | |
|---|---|---|
| 6,080,281 A | 6/2000 | Attia |
| 6,129,949 A | 10/2000 | Schwertfeger et al. |
| 7,560,062 B2 | 7/2009 | Gould et al. |
| 8,632,623 B2 | 1/2014 | Pferrer et al. |
| 8,709,254 B2 | 4/2014 | Kreiter et al. |
| 2004/0024076 A1 | 2/2004 | Davis |
| 2007/0009417 A1* | 1/2007 | Wong ................ C01G 23/0536 502/308 |
| 2010/0015026 A1 | 1/2010 | Yang et al. |
| 2010/0204355 A1* | 8/2010 | Leventis ................ C08G 77/02 521/155 |
| 2011/0243837 A1* | 10/2011 | Shan ........................ B01J 21/08 423/702 |
| 2012/0238445 A1 | 9/2012 | Ebert et al. |
| 2012/0308807 A1 | 12/2012 | Edwards |
| 2015/0203650 A1 | 7/2015 | Kolb et al. |

FOREIGN PATENT DOCUMENTS

| | | |
|---|---|---|
| WO | WO 2011/001036 A1 | 1/2011 |
| WO | WO 2016/161123 A1 | 10/2016 |
| WO | WO 2017/159438 A1 | 9/2017 |

OTHER PUBLICATIONS 1,3,5-trimethylbenzene information. Chembk. https://www.chembk.com/en/chem/1,3,5-Trimethylbenzene. As viewed on Aug. 17, 2022. (Year: 2022).*
Pluronic P-123 and tetramethoxysilane information. Sigma-Aldrich. www.sigmaaldrich.com. As viewed on Aug. 18, 2022 (Year: 2022).*
Cao et al.; "An investigation of the performance of catalytic aerogel filters." Applied Catalysis B: Environmental; Elsevier; 2009; vol. 86; pp. 127-136.
Cui et al.; "Preparation and adsorption property of hydrophobic $SiO_2$ aerogels modified by methyl triethoxysilane." Journal of Wuhan University of Technology-Mater. Sci. Ed. Springer; Dec. 20, 2011; vol. 26; pp. 1079-1083. (Abstract).
Cabanas et al.; "Studies on the porosity of $SiO_2$-aerogel inverse opals synthesized in supercritical $CO_2$." Microporous and Mesoporous Materials; Elsevier; Feb. 2007; vol. 99, Issue 1-2; pp. 23-29.
Gu et al.; "Open cell aerogel foams with hierarchical pore structures." Polymer; Elsevier; 2017; vol. 125; pp. 1-9.
Innocenzi et al.; "Hierarchical Mesoporous Films: From Self-Assembly to Porosity with Different Length Scales." Chemistry of Materials; ACS Publications; Apr. 18, 2011; vol. 23, Issue 10; pp. 2501-2509.
Korhonen et al.; "Inorganic Hollow Nanotube Aerogels by Atomic Layer Deposition onto Native Nanocellulose Templates." ACS Nano; Mar. 1, 2011; vol. 5, No. 3; pp. 1967-1974.
Nemoto et al.; "Simple Freeze-Drying Procedure for Producing Nanocellulose Aerogel-Containing, High-Performance Air Filters." ACS Appl. Mater. Interface; Aug. 24, 2015; vol. 7, Issue 35; pp. 19809-19815.

(Continued)

*Primary Examiner* — Stephen E Rieth
(74) *Attorney, Agent, or Firm* — Thorpe North & Western, LLP

(57) ABSTRACT

Methods of making permeable aerogels (100) can include providing a sol mixture (110) comprising an organic scaffold, an inorganic aerogel precursor, and a first solvent. The organic scaffold can be insoluble in the first solvent. The sol mixture can react to form a gel (120) such that an interconnected channel network is formed which is at least partially defined by the organic scaffold. The first solvent in the gel can be exchanged (130) with a second solvent. The second solvent can dissolve the organic scaffold to expose the interconnected channel network. The gel can be dried (140) to form the permeable aerogel.

16 Claims, 13 Drawing Sheets

(56) References Cited

OTHER PUBLICATIONS

PCT Application No. PCT/US18/55518 Filing date Oct. 11, 2018, Krista Carlson, International Search Report, dated Jan. 7, 2019, 8 Pages.

Shari Li et al.; "Nitrocellulose templated hierarchical pore structure in mesoporous thin films." Inorganic Chemistry Communications; Elsevier; 2006; vol. 9; pp. 7-9.

Yang et al.; "Mechanical properties of silica aerogels prepared from a mixture of TEOS and organo-alkoxysilanes of type $R_1SiX_3$." Organic Materials; Journal of Wuhan University of Technology—mater. Sci. Ed.; Springer; Mar. 8, 2014; vol. 29; pp. 201-207.

Yu et al.; "Hierarchically porous materials: synthesis strategies and structure design." Chemical.

* cited by examiner

METHODS OF MAKING PERMEABLE AEROGELS

RELATED APPLICATION(S)

This application claims priority to U.S. Provisional Application No. 62/571,097, filed Oct. 11, 2017, which is incorporated herein by reference.

GOVERNMENT INTEREST

This invention was made with government support under grant no. DE-EM0004744 awarded by the Department of Energy. The government has certain rights in the invention.

BACKGROUND

Aerogels are a class of ultra-high porosity materials composed of a 3D network of meso- and micro-porous structures. Aerogels are typically dried, low-density, porous solid frameworks obtained from a gel isolated from the liquid component of the gel. The porosity of aerogels can range from 50% to above 99%. Aerogels can be made up of a variety of materials, such as silica, metal oxides, organic polymers, and others. Silica-based aerogels have been extensively characterized and investigated in applications that call for a refractory nature and high chemical durability. Pure silica-based aerogels are typically hydrophilic but can be modified to become hydrophobic through hybridization of the inorganic framework with various organic cross linkers or polymers, which also can increase the mechanical robustness. Although a variety of techniques are known for controlling porosity of aerogels, these techniques have limitations in terms of simplicity and achievable porous properties.

SUMMARY

The present invention involves methods of making permeable aerogels with interconnected channels or 'cells' porosity. In some examples, a method of making interconnected channels or cells within the aerogel can include providing a sol mixture comprising an organic scaffold, an inorganic aerogel precursor, and a first solvent. The organic scaffold can be insoluble in the first solvent. The sol mixture can react to form a gel such that an interconnected channel network is formed which is at least partially defined by the organic scaffold. The first solvent can be exchanged with a second solvent, and the second solvent can dissolve the organic scaffold to expose the interconnected channel network. The gel can then be dried to form the aerogel.

There has thus been outlined, rather broadly, certain features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
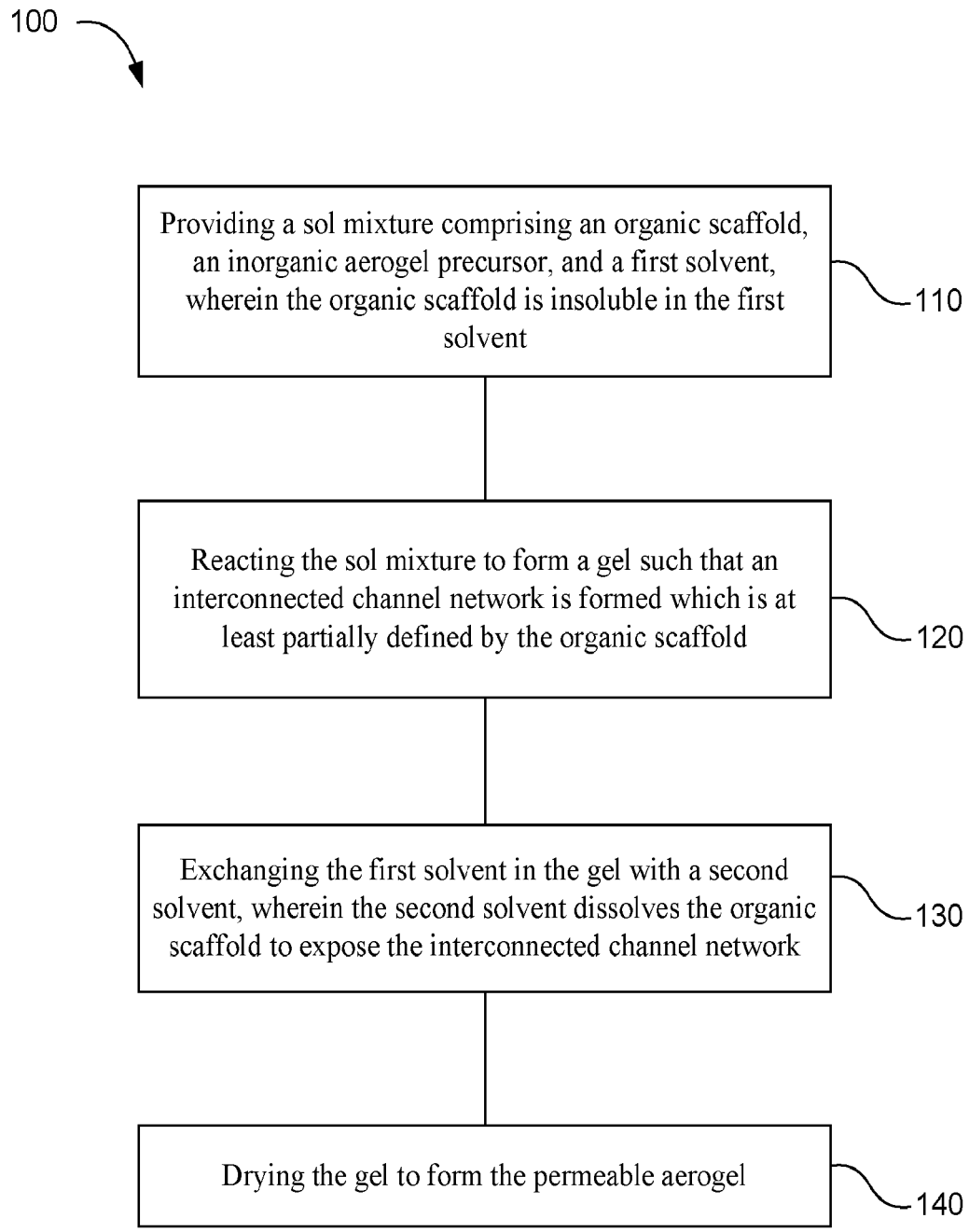
FIG. 1 is a flowchart of an example method of making a permeable aerogel in accordance with examples of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, "aerogel" refers to a low density highly porous solid material made by removing liquid from a gel. Aerogels have a porosity of no less than 50% by volume. In many cases, aerogels can have a much greater porosity, such as greater than 80%, greater than 90%, greater than 95%, greater than 99%, and so on. Aerogels have been produced with as much as 99.98% porosity. Aerogels are produced by removing liquid from a gel in such a way that shrinkage of the gel material is minimized. Typically, liquid removal is accomplished by supercritical drying although other drying methods can be used.

As used herein, "porosity" refers to a fraction of volume of a material that is non-solid volume, with respect to the geometric volume of the material. In aerogels, the non-solid volume is often filled with air. Thus, the porosity of the aerogel can be the volume of air in the aerogel divided by the total geometric volume of the aerogel and encompassed air.

As used herein, "xerogel" refers to a dry solid material formed by removing the liquid from a gel in a way that causes significant shrinkage, such as by room-temperature evaporation. Xerogels can be porous, but often have a porosity of less than 50%.

As used herein, "chemically inert" refers to a chemical compound that does not form or break chemical bonds under the conditions used in the methods described herein. A material that is chemically inert with respect to a second material will not form chemical bonds with the second material or cause any modification of chemical bonds in the second material. In some examples of the present disclosure, an organic scaffold material can be mixed with an aerogel precursor and a solvent in the sol mixture. The organic scaffold material can be chemically inert with respect to the aerogel precursor and the gel that subsequently forms. Therefore, the organic scaffold material does not form chemical bonds with the gel or modify the chemical bonds of the gel. In some examples, the only impact that the organic scaffold has on the gel can be a physical effect of the organic scaffold occupying a portion of the volume in the gel mold to control shape of the formed gel. The gel can form around the organic scaffold, and then the organic scaffold can be removed. After removal of the organic scaffold, the gel can have void spaces or channels where the organic scaffold had previously been. Besides these channels, the dried aerogel may contain no traces of the organic scaffold. Further, the chemical structure of the gel is not affected by the organic scaffold and typically no chemical groups are left behind on the surface of the channels after the scaffold is removed. However, in some cases a portion of the organic scaffold can be left behind. For example, a carbon residue can be left by incomplete dissolution of the organic scaffold. The scaffold remnants can then be calcined (e.g. during drying or subsequent calcination) leaving a carbon residue on inner walls of the channels.

As used herein, "soluble" refers to the ability of solid to dissolve in a particular solvent. More specifically, a solid can be "soluble" in a solvent if at least 1 gram of the solid can dissolve in 100 mL of the solvent at the stated or relevant process conditions. "Insoluble" generally means that a solid cannot be dissolved in a solvent. In particular, a solid can be termed "insoluble" in a solvent if less than 0.1 gram is able to dissolve in 100 mL of the solvent at the stated or relevant process conditions.

As used herein, "permeable" refers to the ability of a material to allow gas to flow through the material. Some examples of the present technology include permeable aerogels that can allow gas to flow through the aerogels because of an augmented network of interconnected channels in the aerogels.

As used herein, "permeability" is a property of a permeable material. Permeability k can be defined by Darcy's law (equation 1):

$$Q = \frac{kA\Delta P}{\mu L} \qquad (1)$$

where Q is the flow rate of gas ($m^3$/s), k is the permeability ($m^2$), A is the cross-sectional area of the membrane, $\Delta P$ is the pressure drop (kPa), $\mu$ is the viscosity of gas (kPa·s) and L is the length of the sample that the gas passes through (m).

As used herein, "organic" refers generally to chemical compounds containing carbon, with few exceptions such as carbon dioxide and carbonates. Organic compounds may be naturally occurring or synthetic, and may include a variety of other elements in addition to carbon. "Inorganic" refers to compounds that are not organic. In examples of the present technology, inorganic aerogels can be made up of non-carbon materials, such as silica or metal oxides. In certain examples, inorganic aerogels can include organic groups, such as methyl groups attached to a silica aerogel. These organic groups may be included, for example, to make the aerogel more hydrophobic. The aerogel as a whole can still be referred to as "inorganic" even with the inclusion of such organic groups.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally, the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Methods of Making Permeable Aerogels

The present technology provides methods for making permeable aerogels that have an interconnected channel network throughout the aerogels to increase the gas permeability of the aerogels. As mentioned above, aerogels have very high surface areas. This high surface area makes aerogels attractive for gas filtering applications such as removing unwanted species from gases.

One of the challenges hindering aerogel use in gas filtration applications is the isolated porosity of the structural framework, making the aerogels nearly impermeable to gases. Although packed bed systems have been examined, the implementation of this ultralight material into real-world applications poses some challenges, such as non-uniform flow through the system (i.e., channeling) and difficulties with maintenance. Adjusting the permeability of silica-based aerogels can enable their use as membrane gas filters, eliminating some of the issues faced by these packed-bed systems. Prior studies have focused on altering the sol-gel chemistry to produce aerogel structures with increased permeability to gases or using templates removable by calcination to form channel structures. For example, some methods calcine the aerogel at high temperatures of 450° C. or higher to burn away templates and thereby form tubes or channels through the aerogel. While this may be effective for fully inorganic aerogels, calcining may not be feasible for aerogels modified with organic groups that are typically processed at lower temperatures to maintain structural integrity and/or hydrophobicity of the organic groups.

The methods described herein can produce aerogel materials with increased gas permeability by using a removable organic scaffold. In one particular example, the organic scaffold can be nitrocellulose $(C_6H_{(10-n)}O_5(NO_2)_n$, where $0<n\leq3)$. Nitrocellulose can be dispersed in the sol as a part of the sol-gel process of forming aerogel. Nitrocellulose can also be easily removed from the gel by dissolution.

In certain examples, nitrocellulose (NC) fibers can be placed directly into a sol with ethanol as the solvent during gelation. After gelation, solvent exchange can be performed with acetone. The NC fibers, although insoluble in ethanol, can be soluble in acetone. Thus, the NC can dissolve, leaving an open channel structure that remains after drying of the aerogel. In some examples, the final aerogel can be a permeable membrane for gas filtration. In other specific examples, an NC lacquer can be formed by dissolving NC in acetone. This lacquer can be mixed with a sol that includes ethanol as the solvent. In this case, the sol can separate into an NC lacquer-rich phase dispersed in a sol-rich phase. After gelation, solvent exchange with acetone can dissolve away the NC lacquer-rich phase, leading to a highly permeable aerogel with interconnected porosity.

With this description in mind, FIG. 1 is a flowchart showing an example method 100 of making a permeable aerogel. The method includes: providing 110 a sol mixture comprising an organic scaffold, an inorganic aerogel precursor, and a first solvent, wherein the organic scaffold is insoluble in the first solvent; reacting 120 the sol mixture to form a gel such that an interconnected channel network is formed which is at least partially defined by the organic scaffold; exchanging 130 the first solvent in the gel with a second solvent, wherein the second solvent dissolves the organic scaffold to expose the interconnected channel network; and drying 140 the gel to form the permeable aerogel.

Figure 2:
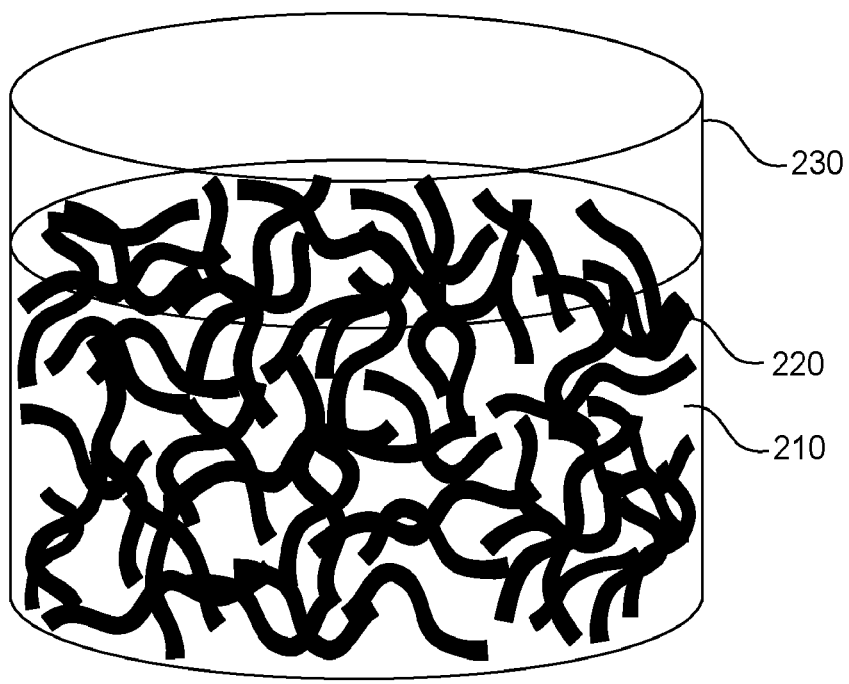
FIG. 2 is a schematic view of an example sol mixture in accordance with examples of the present disclosure.

In practice, the organic scaffold can be formed in a number of different ways. In some examples, the organic scaffold can be formed by mixing a solid organic scaffold material directly with the sol mixture. In certain examples, the solid organic scaffold material can be in the form of solid fibers, such as fibers of nitrocellulose. In this case, the solid organic scaffold material is suspended or dispersed within a sol mixture where the scaffold material is a solid phase within a liquid sol phase. FIG. 2 shows a sol mixture 210 including organic fibers 220. This mixture is inside a mold 230. The organic fibers are insoluble in the solvent used in the sol mixture. Therefore, the organic fibers remain in solid form. The organic fibers can be mixed into the sol mixture so that the fibers create a network of fibers that touch one another at various points in the sol mixture. This scaffold occupied network can form at least a portion of porous networks formed during processing.

Figure 3:
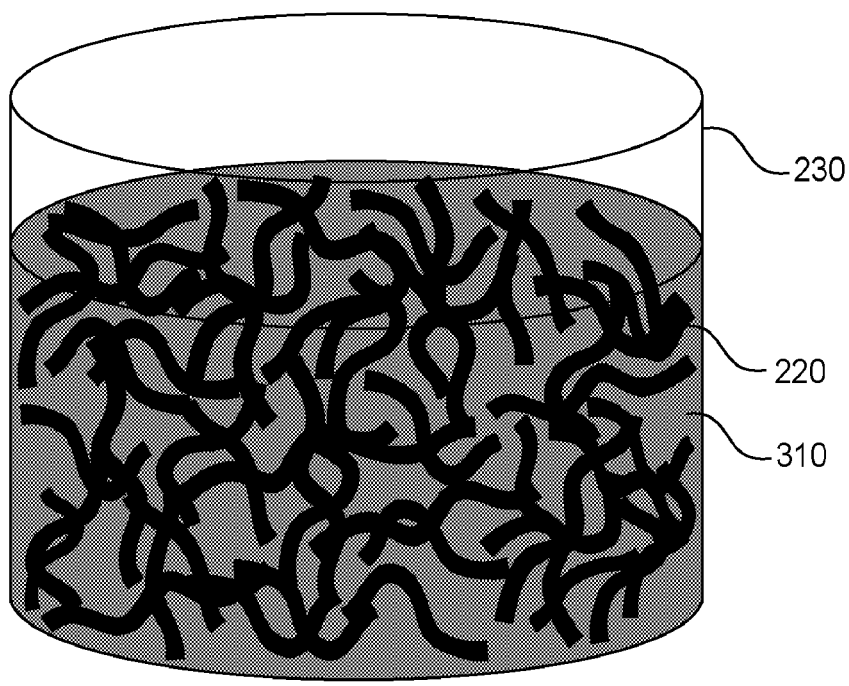
FIG. 3 is a schematic view of an example gel with fiber scaffold material in accordance with examples of the present disclosure.

The sol mixture 210 of FIG. 2 can also include inorganic aerogel precursors and catalysts for reacting the inorganic aerogel precursor to form a gel. FIG. 3 shows the gel 310 after this gelation reaction occurs. The gel forms when molecules of the inorganic aerogel precursor react and link together. In some examples, the inorganic aerogel precursor molecules can first join together to form nanoparticles, and then the nanoparticles can join together to form a network of an inorganic solid. This solid network can be sufficiently strong to hold its shape. The liquid components of the sol mixture can remain in the interstitial spaces of the solid inorganic network. In this example, the gel can hold the shape of the mold 230 in which the gel was formed. The solid organic fibers 220 remain in the gel as an organic scaffold. In some examples, the organic scaffold can be inert with respect to the gel and the reactants in the sol mixture. Thus, the organic scaffold material does not participate chemically in the gelation reaction. However, the organic fibers in this example physically affect the gel by occupying a portion of the volume in the mold. The organic fibers can subsequently be removed, and the volume occupied by the fibers can be left empty as a network of channels throughout the gel. Notably, the organic scaffold fibers can form at least a portion of the network of channels. However, some of the channels can form independent of the scaffold. As a general guideline, the scaffold generated porosity can form from about 0.1 volume % to about 90 volume % of the porous network, and in some cases from about 40 to about 70 volume %.

Figure 4:
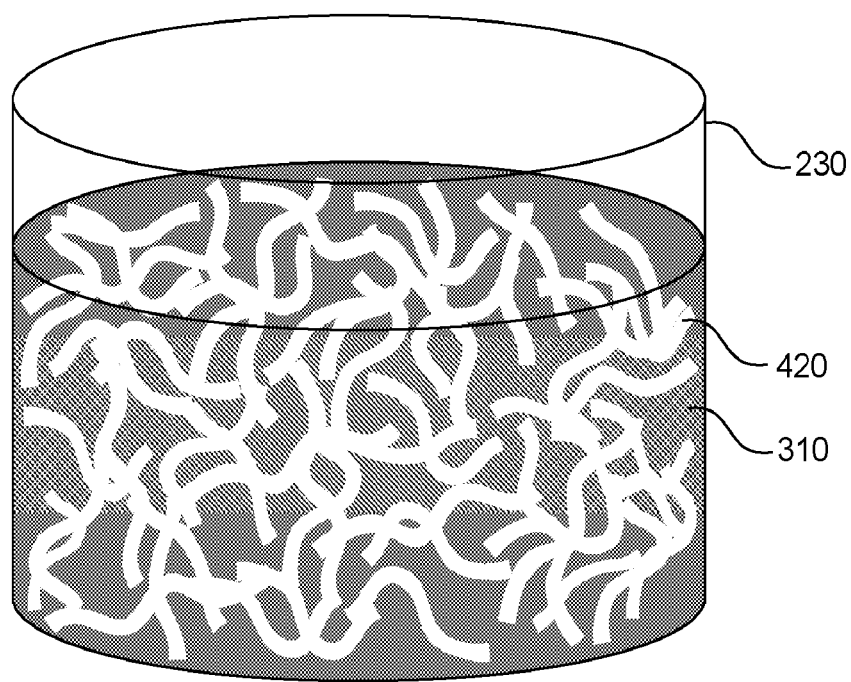
FIG. 4 is a schematic view of another example gel having the scaffold removed in accordance with examples of the present disclosure.

FIG. 4 shows the gel 310 in the mold 230 after the organic fibers have been removed by dissolution. In some examples, the gel can be soaked in a second solvent that is capable of dissolving the organic fibers. The second solvent can replace the first solvent that was used in the sol mixture. In some cases, the second solvent can be replaced with fresh solvent multiple times. The organic fibers can be dissolved by second solvent, and the dissolved organic material and other byproducts of the gelation reaction can be removed by replacing the second solvent with fresh solvent. The dissolved fibers can leave behind an interconnected channel network 420 in the gel. Although the gel is shown still in the mold, in many cases the gel can be removed from the mold during the solvent exchange process to allow the solvents to exchange more effectively.

Figure 5:
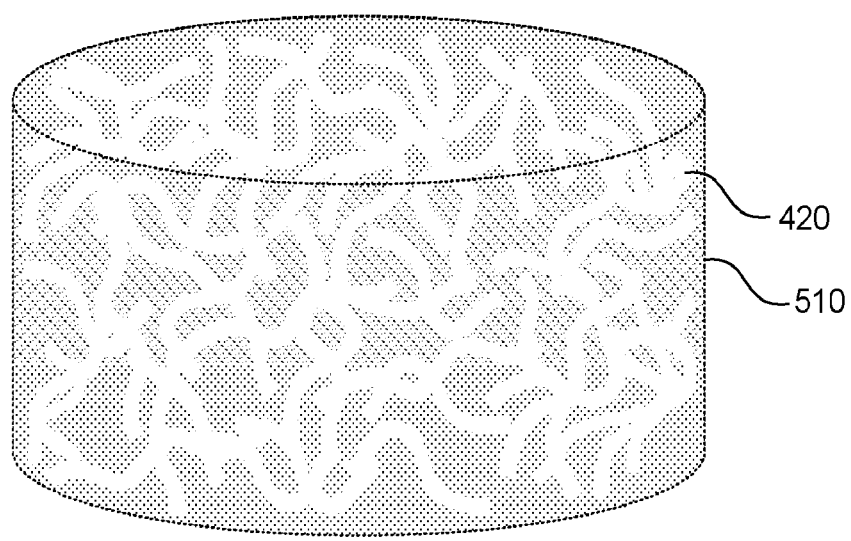
FIG. 5 is a schematic view of an example dried permeable aerogel in accordance with examples of the present disclosure.

After exchanging the solvent in the gel 310 and dissolving the organic fibers to form the interconnected channel network 420 as shown in FIG. 4, the gel can be dried to remove the solvent from the gel. In some examples, this can be accomplished by supercritical drying involving replacing the solvent with supercritical carbon dioxide. The gel can be held at a high pressure during supercritical drying, and the pressure can then be released to leave an aerogel with carbon dioxide occupying the pores instead of solvent. FIG. 5 shows an aerogel 510 after being dried and removed from the mold. The interconnected channel network 420 is preserved in the aerogel. Thus, the aerogel has increased permeability due to the interconnected channel network.

In an alternate example, the organic scaffold can be formed by dissolving an organic material in a solvent to form a lacquer, and then mixing the lacquer into the sol mixture. For convenience, the solvent used to dissolve the organic scaffold material can be referred to as a "scaffold solvent." The sol mixture can include a different solvent that does not dissolve the organic scaffold material in order to maintain chemical inertness. When the lacquer is mixed with the sol mixture, the mixture can separate into a lacquer-rich phase and a sol-rich phase. Without being bound to a particular mechanism, in some cases the lacquer-rich phase may include the organic scaffold material dissolved in the scaffold solvent in a liquid form such as in very small droplets (e.g., micron scale or smaller). In other cases, the lacquer-rich phase may include a fine precipitate of the organic scaffold material. In either case, the lacquer-rich phase can form an interconnected network similar to the network of solid organic fibers described in the previous example, or in some cases act to introduce additional connections between porous networks natively formed during gelation. In this way, the scaffold phase acts as a network enhancement agent which creates segmented channels which bridge adjacent channels formed directly during gelation but without a templating scaffold material.

Figure 6:
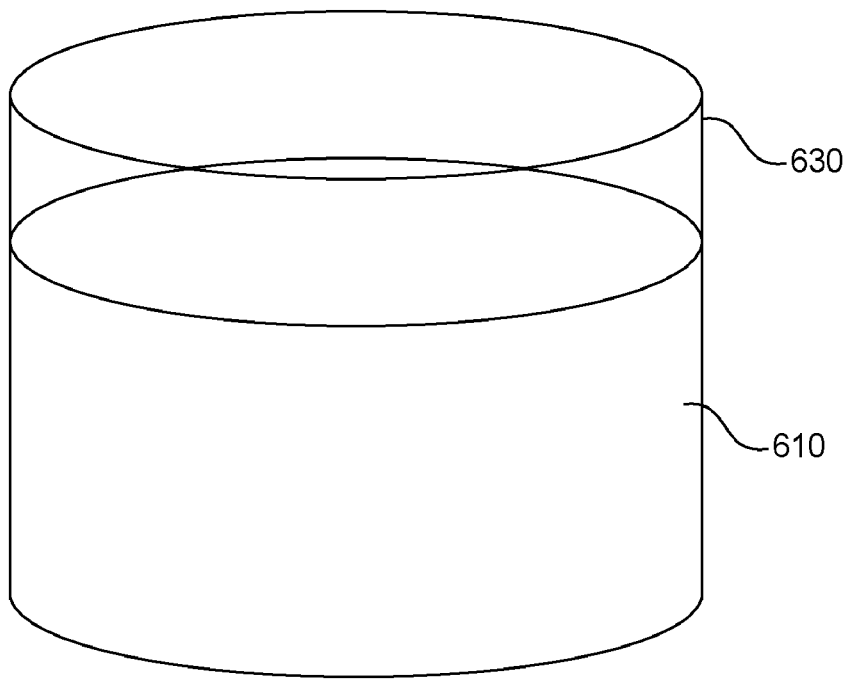
FIG. 6 is a schematic view of another example sol mixture in accordance with examples of the present disclosure.
Figure 7:
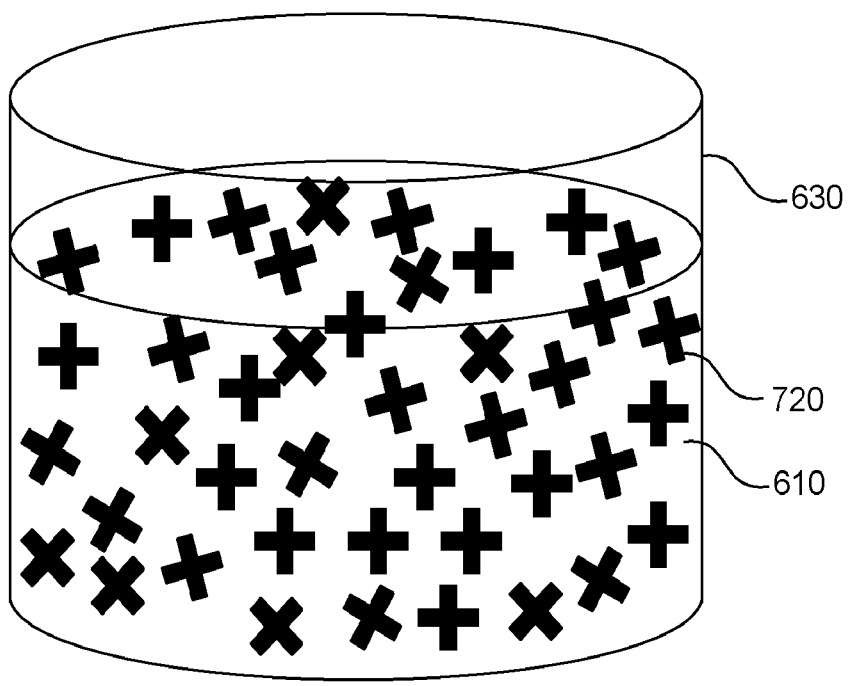
FIG. 7 is a schematic view of yet another example sol mixture using a lacquer in accordance with examples of the present disclosure.

FIG. 6 shows an example sol mixture 610 in a mold 630 where the sol mixture includes a lacquer formed by dissolving an organic scaffold material in a scaffold solvent. In FIG. 6, the sol mixture is all in a liquid phase. FIG. 7 shows the sol mixture 610 with a fine solid precipitate of the organic scaffold material 720. For clarity, the solid precipitate is shown as discrete particles. However, in practice the precipitate, in addition to any liquid lacquer-rich phase, can be distributed throughout the sol mixture in a sufficient amount to make an interconnected network. That is, many of the precipitate particles and/or droplets of lacquer-rich phase can be in contact with neighboring particles and/or droplets so that a continuous network is formed. In one alternative, an amount of water can be added to the lacquer-rich phase sufficient to precipitate out at least a portion of the scaffold material as solid particles.

Figure 8:
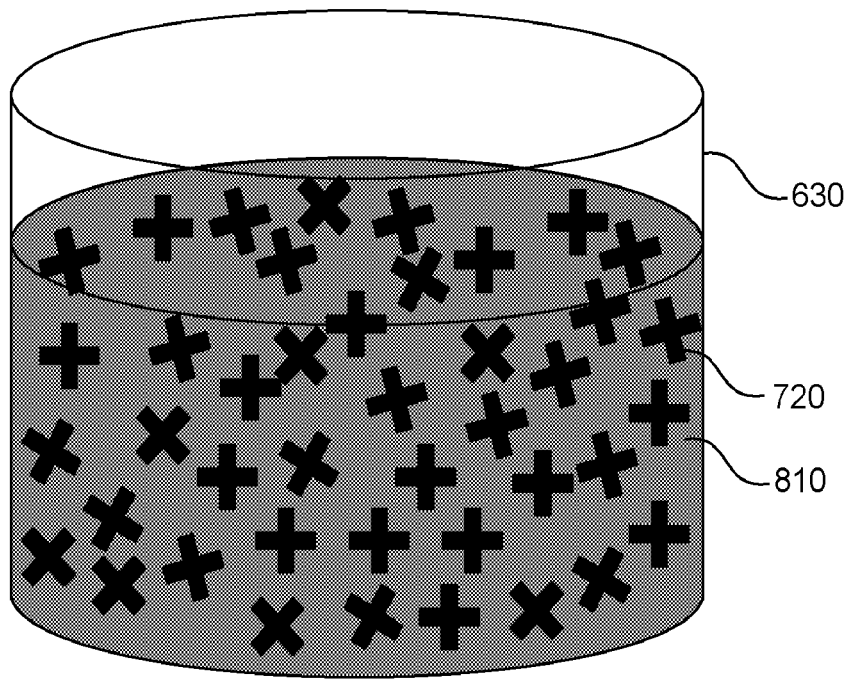
FIG. 8 is a schematic view of another example gel in accordance with examples of the present disclosure.
Figure 9:
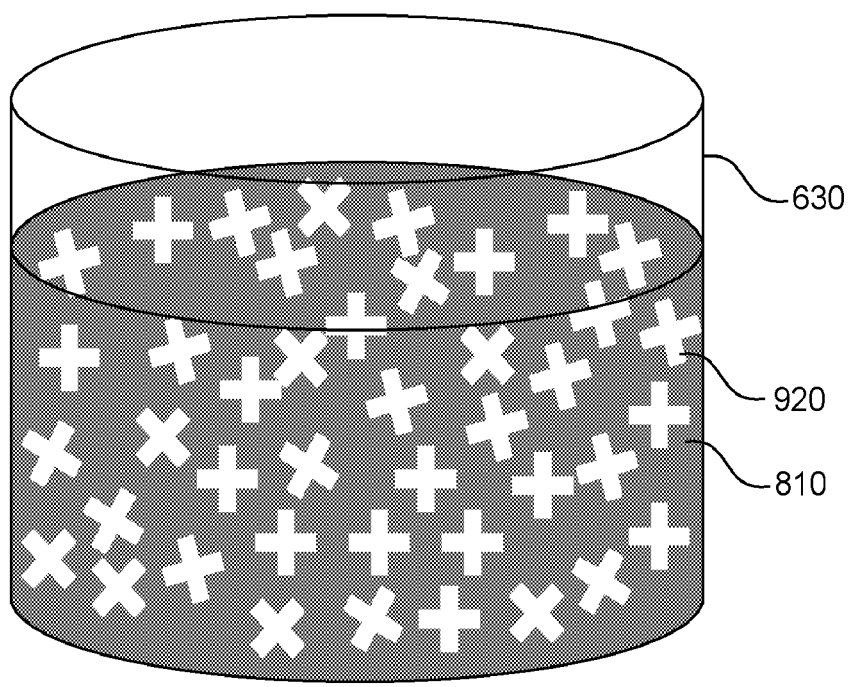
FIG. 9 is a schematic view of yet another example gel with the scaffold removed in accordance with examples of the present disclosure.

The sol mixture can then react to form a gel 810, as shown in FIG. 8. The precipitated organic scaffold material 720 remains in place within the gel. The gel can set sufficiently to hold the shape of the mold 630. After gelation, the solvent used in the sol mixture can be exchanged with a second solvent that can dissolve the organic scaffold material. As described above, this can be accomplished by adding and removing the second solvent multiple times to dissolve and remove the organic scaffold material as well as other byproducts of the gelation reaction. FIG. 9 shows the gel 810 after the organic scaffold material has been dissolved away, leaving an interconnected channel network 920 in place of the organic scaffold material. Again, for clarity the organic scaffold precipitate was shown as discrete particles and the spaces left behind after dissolving the organic scaffold material may appear to be discrete spaces. However, in practice, the voids left after dissolving the organic scaffold material can contact each other sufficiently to form an interconnected network of channels or further interconnect channels formed during gelation (i.e. in the absence of filler scaffold material). In some cases, the interconnected channel network produced using this lacquer method can have finer, smaller sized channels compared to interconnected channel networks produced using solid organic scaffold fibers.

Figure 10:
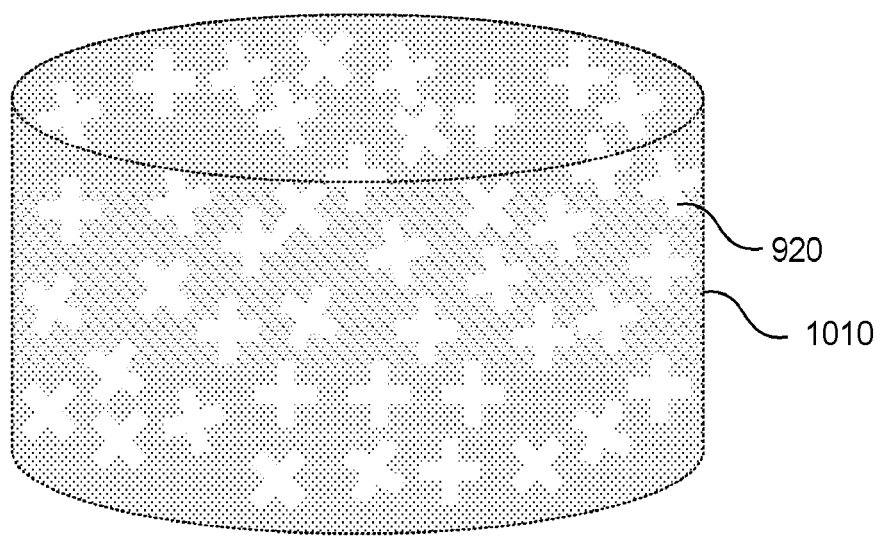
FIG. 10 is a schematic view of another example dried permeable aerogel in accordance with the present disclosure.

After dissolving the organic scaffold material, the gel can be dried to form an aerogel. FIG. 10 shows the final aerogel 1010 after being dried and removed from the mold. The aerogel can include a dry inorganic network formed by linking molecules of the inorganic aerogel precursor compound. The interconnected channel network 920 formed by dissolving the organic scaffold material remains in the aerogel.

In specific examples, the aerogels shown in FIGS. 5 and 10 can be silica-based aerogels. In some examples, the inorganic aerogel precursor compound used to form these aerogels can include tetraethoxysilane (TEOS). Additionally, in some cases the inorganic aerogel precursor can also include methyltriethoxysilane (MTES), or a mixture of TEOS and MTES. The methyl group on MTES can help increase the hydrophobicity of the aerogel. In further specific examples, the organic scaffold material can include nitrocellulose. The nitrocellulose can be soluble in acetone, but not soluble in ethanol. Accordingly, in certain specific examples the solvent used in the sol mixture can be ethanol and the second solvent used to dissolve the nitrocellulose scaffold can be acetone. Acetone can also be used to dissolve nitrocellulose to form a lacquer in the lacquer method described above.

Although many of the examples described herein use the particular ingredients nitrocellulose, TEOS, MTES, ethanol, acetone, and so on, these are only a few examples of materials that can be used with the methods described herein. A variety of materials can be used to form the permeable aerogels described herein.

The organic scaffold can be made of a material selected for its solubility properties. Generally, the organic scaffold can be insoluble in a first solvent used in the sol mixture of the sol-gel process. A second solvent can also be compatible with the sol-gel process, so that the second solvent can be exchanged with the first solvent after gelation. The organic scaffold material can be soluble in the second solvent. Accordingly, any solid organic material that is insoluble in such a first solvent and soluble in such a second solvent can be used as the organic scaffold. Generally, the scaffold material can be compatible with aerogel precursors (e.g. do not react) while also being dissolvable in a corresponding solvent that also does not affect the gel microstructure or the inorganic aerogel.

In various non-limiting examples, the organic scaffold can include nitrocellulose, polystyrene, acrylonitrile butadiene styrene, polycarbonate, tosylamide/formaldehyde resin, E-3606 (TYGON), polyvinyl chloride, nitrile and combinations thereof which are soluble in acetone. Polyester can also be suitable as an organic scaffold material which is soluble in isopropanol. Polyethylene and silicone can also be suitable as organic scaffold material which are soluble in butyl alcohol. Other combinations and choices of organic scaffold materials and solvents can also be made consistent with the principles outlined herein.

Figure 11:
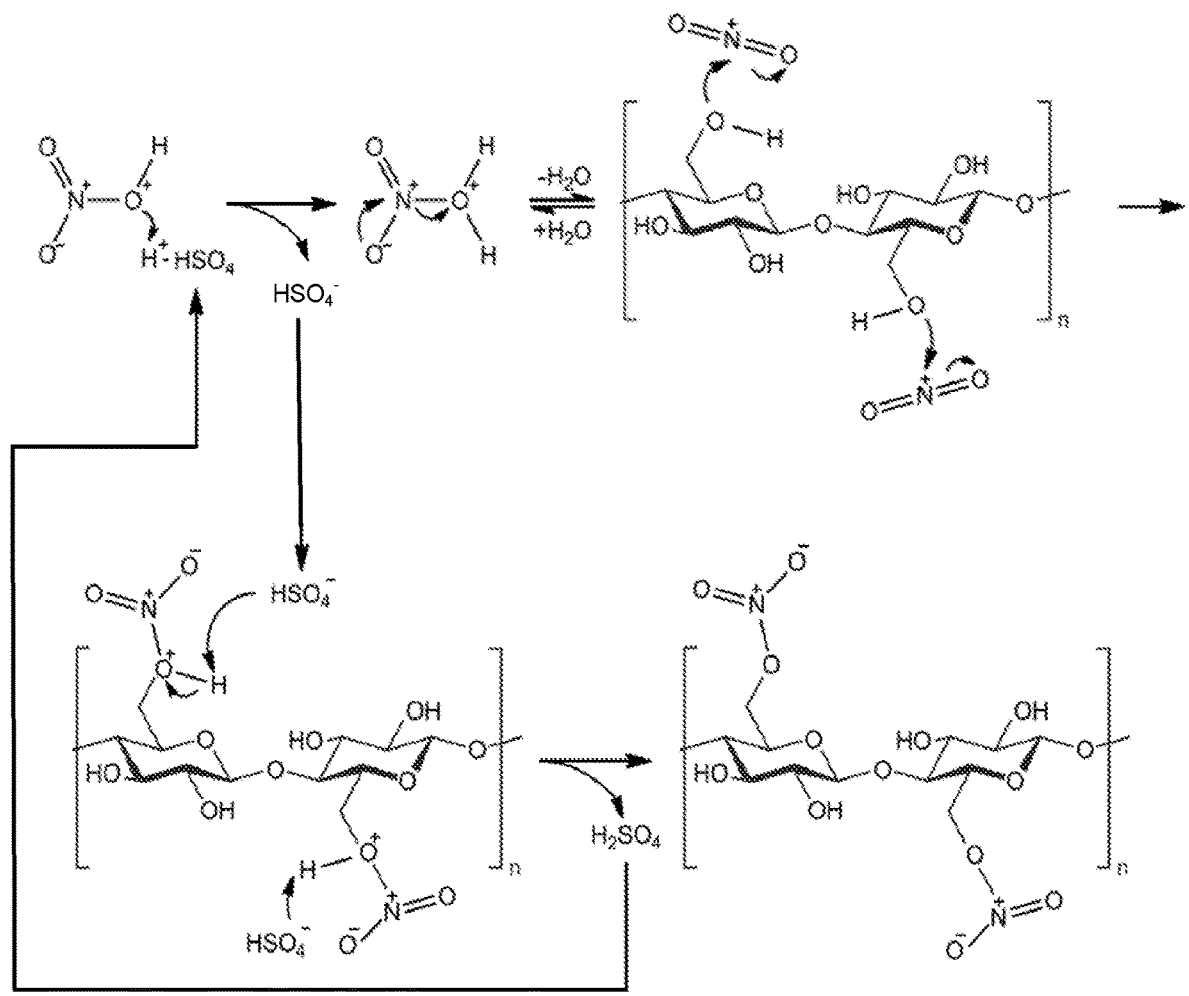
FIG. 11 is a scheme showing a chemical reaction for forming nitrocellulose in accordance with examples of the present disclosure.

Nitrocellulose (NC) can be useful as the organic scaffold material due to its ability to form fibers, solubility in certain solvents, and insolubility in other solvents. NC is nitrated cellulose that can be formed by reaction of cellulose with nitric acid. In some examples, NC can be formed through an esterification reaction graphically represented in FIG. 11. In this process, nitronium cations ($NO_2^+$) react with the alcohol groups (—OH) located at the C6, C2, and C3 positions on the glucose units of cellulose to form —$ONO_2$. Substitution of the (—OH) with nitrate groups (—$ONO_2$) decreases the autoignition temperature of fibers from about 350° C. to 150-186° C., and increases solubility in organic solvents. The presence of $H_2SO_4$ assists in the formation of $NO_2^+$ and acts as a dehydrating agent to remove the water molecules formed from the removal of the —OH groups. Notably, NC can be formed in any suitable manner. For example, cellulose can be reacted with $HNO_3$ with pre-preparation with $HNO_3/P_2O_5$, $HNO_3$/acetic acid, acetic anhydride, or the like.

Theoretically, the highest achievable nitrogen content is ca. 14.15 wt %, corresponding to the replacement of all three reactive —OH on each glucose unit with —$ONO_2$. The solubility of the NC is dependent upon the nitrogen content. When the nitrogen content is between 10.7 wt %-11.3 wt %, NC is reportedly soluble in alcohols, ketones, esters, and glycol ethers, while at nitrogen contents ≥11.3 wt % the NC is no longer soluble in ethanol. Accordingly, in some examples, the organic scaffold can include NC with a nitrogen content from about 11.3 wt % to about 14.15 wt %.

In certain examples, the organic scaffold can be in the form of solid fibers. The fibers can have a thickness (e.g., diameter) from about 1 micrometer to about 50 micrometers in some examples. In further examples, the fibers can have a thickness from about 5 micrometers to about 30 micrometers. In still further examples, the fibers can have a thickness from about 10 micrometers to about 20 micrometers. In other applications, fibers can have a thickness from about 100 μm to about 500 μm. Such thicker fibers can be useful for preparation of substrates for cell infiltration (e.g. bone regrowth), and the like. The length of the fibers is not particularly limited. In some examples, the fibers can have a length from about 50 micrometers to about 10 cm. In further examples, the fibers can have a length from about 100 micrometers to about 1 cm.

In other examples, the organic scaffold can be in the form of a lacquer. The lacquer can be made by dissolving an organic scaffold material in a scaffold solvent. In certain examples, the scaffold solvent can be any solvent capable of dissolving the organic scaffold material, while in particular examples the scaffold solvent can be the same solvent used later to dissolve the organic scaffold after gelation. In one example, the organic scaffold material can be nitrocellulose and the scaffold solvent can be acetone. Other non-limiting examples of scaffold solvents can include acetone, methyl ethyl ketone, methyl isobutyl ketone, methyl glycol ether, ethyl glycol ether, isopropyl glycol ether, and combinations thereof. Any suitable amount of organic scaffold material can be dissolved in the scaffold solvent to form the lacquer. In some examples, from about 1 mg to about 100 mg of the organic scaffold material can be dissolved per 1 mL of scaffold solvent.

The organic scaffold material, whether in solid or lacquer form, can be mixed with the sol mixture. The amount of organic scaffold material in the sol mixture can be selected to provide a sufficiently continuous network of organic scaffold to increase the porosity of the aerogel. In some examples, using a greater amount of organic scaffold material can further increase the porosity of the resulting aerogel, while using a smaller amount of organic scaffold material can result in less of an increase in porosity. In some cases, using too much organic scaffold material may reduce the structural strength of the aerogel because too much of the aerogel will be replaced by void channels. Accordingly, the amount of organic scaffold can be selected to balance the permeability of the aerogel with the structural integrity of the aerogel. In certain examples, the amount of organic scaffold material in the sol mixture can be from about 5 grams per liter of sol mixture to about 50 grams per liter of sol mixture. The organic scaffold can also occupy from about 0.1% to about 90% of the total volume of the sol mixture, and in some cases from about 40% to about 70%.

In lacquer methods, the amount of lacquer added to the sol mixture can control the total amount of organic scaffold material as well as the phase separation and/or precipitation of the organic scaffold material in the sol mixture. In some examples, the lacquer can be from about 10% to about 50% of the sol mixture by volume. The lacquer can form a solid precipitate of the organic scaffold material and/or the lacquer can form a separate lacquer-rich liquid phase dispersed in the sol mixture. The particle size of droplet size of the precipitate or lacquer-rich phase can be relatively small compared to solid fibers. In some examples, the size of the precipitate particles or lacquer-rich droplets can be from about 0.1 micrometer to about 5 micrometers. Accordingly, channels in the final aerogel formed using a lacquer can have similar diameters.

The sol mixture can include a first solvent. Generally, the sol-gel process starts with nanoparticles of the aerogel precursor dispersed as a colloid in the first solvent. In some cases, the nanoparticles can form in solvent by reaction of the aerogel precursor, such as when TEOS molecules link together to form nanoparticles. In other examples, nanoparticles may be formed elsewhere and then dispersed in the solvent. In either case, the first solvent can be a solvent capable of holding these nanoparticles as a colloidal dispersion. Additionally, the first solvent can be a solvent that does not dissolve the organic scaffold material.

In various examples, the first solvent can include any solvent in which the organic scaffold is not soluble at given mixing and gel formation conditions, while also being soluble in the second solvent at the scaffold removal conditions.

The aerogel precursor can be selected depending on the desired material of the final aerogel. In some examples, silica-based aerogels can be made from silicon-containing precursors, such as silicon alkoxides or silicates. Silicon alkoxide precursors, such as TEOS or tetramethoxysilane (TMOS) can be reacted with water in the presence of a catalyst to form a gel. The water can react with the silicon alkoxide in a combination of hydrolysis and condensation reactions to join together multiple silicon alkoxide molecules, forming nanoparticles and eventually a solid silica network. Silicon alkoxides with organic groups, such as MTES, can also be included in this reaction to form a silica network with attached organic groups.

In one example, the aerogel precursor can be TEOS. The TEOS can react with water in the present of a basic catalyst according to the reactions shown in Schemes 1 and 2:

Hydrolysis

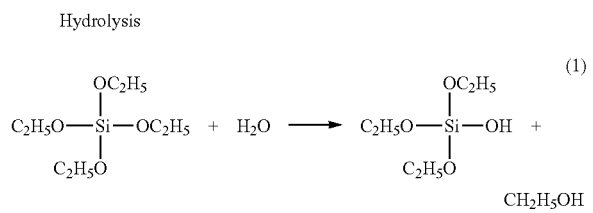

(1)

Condensation

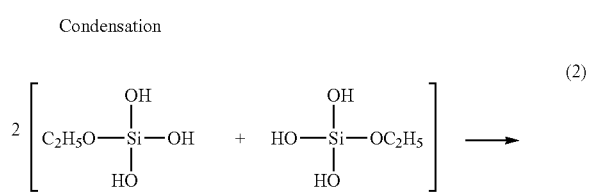

(2)

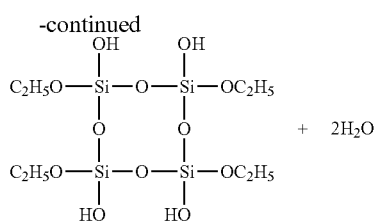

First, a TEOS molecule can be hydrolyzed to convert the alkoxide to a silanol, and then the silanols can undergo condensation to form Si—O—Si bonds.

In another example, the aerogel precursor can include MTES, which has one methyl group and three alkoxide groups. The methyl group is not hydrolyzable, but the three alkoxide groups can hydrolyze and condense according to the reactions in Schemes 3 and 4:

Hydrolysis

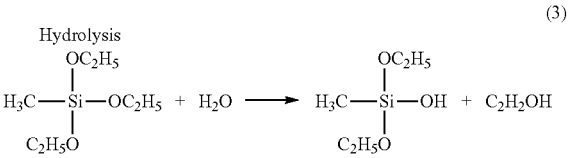

(3)

Condensation

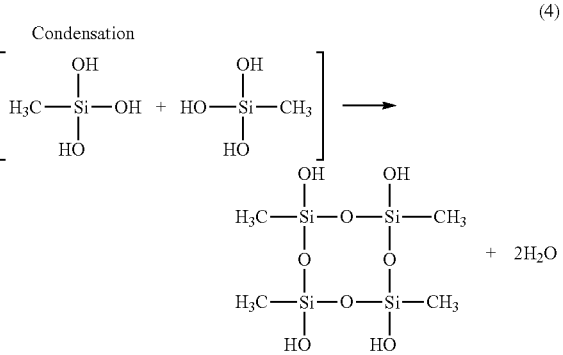

(4)

In some cases, the methyl groups can be used to increase hydrophobicity of exposed surfaces. This can lead to an aerogel with increased robustness and flexibility compared to TEOS aerogels. In some examples, the aerogel precursor can be a mixture of TEOS and MTES. In one particular example, the aerogel precursor can be a mixture of 75 vol % TEOS and 25 vol % MTES.

Alternatively, silica aerogels can be formed from a silicate material using the "waterglass" method. In certain examples, a sodium silicate can be used as the precursor and the sodium silicate molecules can undergo hydrolysis and condensation in the presence of an acidic catalyst. Specific examples of sodium silicate precursors include $Na_2SiO_3$, sodium polysilicate $(Na_2SiO_3)_n$, $Na_4SiO_4$, and others.

In further examples, other aerogel precursors can be used to make aerogels having different compositions. Aerogels of metal oxides can be formed using metal-containing precursors. Other types of aerogels can include metal aerogels, carbon nanotube aerogels, metal chalcogenide aerogels, and so on. Each type of aerogel may be made from specific aerogel precursor materials. In various examples, the aerogel precursor used in the methods described herein can include, but are not limited to, a metal alkoxide, a metal salt, and the like. Specific non-limiting examples can include a silicon alkoxide, tetraethoxysilane, tetramethoxysilane, methyltriethoxysilane, sodium silicate, aluminum alkoxide, aluminum nitrate, aluminum chloride, titanium alkoxide, titanium nitrate, titanium chloride, zirconium nitrate, zirconium chloride, zirconium alkoxide, hafnium nitrate, hafnium chloride, hafnium alkoxide, niobium nitrate, niobium chloride, niobium alkoxide, tantalum nitrate, tantalum chloride, tantalum alkoxide, chromium nitrate, chromium chloride, chromium alkoxide, tungsten nitrate, tungsten chloride, tungsten alkoxide, iron nitrate, iron chloride, iron alkoxide, indium nitrate, indium chloride, indium alkoxide, gallium nitrate, gallium chloride, gallium alkoxide, tin nitrate, tin chloride, tin alkoxide, calcium phosphate, and combinations thereof. Other examples can include bismuth nitrate, bismuth chloride, calcium nitrate, calcium chloride, sodium chloride, sodium nitrate, potassium chloride, potassium nitrate, silver chloride, silver nitrate, copper chloride, copper nitrate, cobalt chloride, cobalt nitrate, and the like. For example, silica based aerogels can be particularly suitable as high performance filters and gas sensors. Similarly, calcium phosphate-based aerogels can be particularly suitable as bone regeneration substrates. Calcium aluminosilicate-based materials can be used as scaffolds for dental pulp capping. Titanium dioxide-based aerogels can be used as filters for photocatalytic, photoelectrocatalytic, or electrocatalytic degradation of pathogens or organic pollutants in water. Titanium dioxide-based aerogels can also be utilized as sensor platforms to detect diseases which cause biomarkers to be present in the breath.

As mentioned above, in some examples the sol mixture can include a catalyst to facilitate the gelation reaction of the aerogel precursors. In some examples, the catalyst can be an acid, a base, a fluoride-containing catalyst, or other catalysts that are active to catalyze polymerization reactions of the particular precursors being used. In certain examples, a basic catalyst can be included in the sol mixture. In further examples, a combination of a basic catalyst and a fluoride-containing catalyst can be used. Non-limiting examples of basic catalysts can include ammonium hydroxide, sodium hydroxide, sodium carbonate, potassium carbonate, and the like. Non-limiting examples of fluoride-containing catalysts can include ammonium fluoride, tetraalkylammonium fluoride, and the like. The amount of the catalyst in the sol mixture can be relatively small such as about 0.001 wt % to about 0.1 wt % of the total weight of the sol mixture. As a general guideline, acidic versus basic catalysts will change resulting aerogel microstructure. For example, acidic catalysts tend to form thinly branched structures, while more basic materials form thicker connected spheres. Similarly, a higher concentration of catalyst will result in relatively faster gelation and higher density of cross-linking relative to lower concentrations which gel slower.

Optionally, the sol mixture can include additives. Similarly, the organic scaffold can be functionalized with residual materials which can be intentionally let behind during scaffold removal. In one example, metal cations or nanoparticles can be easily incorporated into the organic scaffold. For example, compounds that release iron cations or iron nanoparticles can be included in the scaffold to create magnetic channels. In another example, silver nitrate can be used to introduce silver into silica aerogels for capture of radioiodine from off-gas produced during nuclear waste processing. However, silver can also be used as a bacteriostatic/antimicrobial additive. Other additives can be incorporated into an aerogel via functionalization or association with the organic scaffold which can be left behind on channel walls upon scaffold removal. Alternatively, organics that are not soluble in the scaffold solvent could also be added to impart mechanical strength or toughness. In one example, cellulose can be incorporated into the scaffold. In this case, after supercritical drying a hybrid structure of silica and cellulose would be formed, which would increase the overall toughness of the material.

The sol mixture can generally be well-mixed by a vortex mixer or any other suitable mixing method. The organic scaffold can be mixed into the sol mixture at this point. The sol mixture can then be placed in a mold and allowed form a gel. The gelation time can vary depending upon the materials of the sol mixture. In some examples, the gelation time may be from about 1 minute to several days. In some cases, the gel can form to the point that the gel holds the shape of the mold and can be removed from the mold if desired. At this point, there may still remain some unreacted aerogel precursor in the gel. For example, some alkoxide groups of a silicon alkoxide precursor may remain unreacted even though the gel has formed sufficiently to hold its shape. The unreacted groups may continue to react during solvent exchange (e.g. modified aging step).

The mold can be formed in any suitable shape, depending on the intended application. For example, in many cases the aerogel material can be formed as a membrane having a relatively planar shape with a desired thickness. Thicknesses of the membrane can vary considerably depending on the application. In some examples, thicknesses can range from about 0.5 μm to about 20 cm, and in some cases from about 5 mm to 10 cm. Similarly, other shapes can be useful as a bone regeneration substrate. In such cases, the material can be formed as a membrane which is laid onto a bone surface. Other shapes can include, but are not limited to, cylinder, cuboid, tooth root shaped, and the like.

In some examples, the organic scaffold can be chemically inert with respect to the gelation reaction. In such examples, the organic scaffold does not form any chemical bonds with the precursor molecules or the solid network formed from the precursor during gelation. Additionally, the organic scaffold does not act as a seed to initiate the polymerization of the precursor molecules, or as a catalyst in the reaction.

When the gel has set sufficiently to hold its shape, the gel can also hold the shape of the organic scaffold after the organic scaffold is removed. Therefore, the gel can be placed into a second solvent to exchange the first solvent in the gel with the second solvent. The second solvent can be capable of dissolving the organic scaffold. As the second solvent dissolves the organic scaffold, the second solvent can be replaced with fresh second solvent to flush out the dissolved organic scaffold material. Other materials in the aerogel (e.g. water, catalyst, unreacted precursor, etc.) can also be flushed out by the solvent exchange. The organic scaffold can leave void spaces in the gel forming at least part of an interconnected channel network. The interconnected channel network can thus have the same shape as the organic scaffold in areas formed by the scaffold. However, some portions of the channel network can be independently formed during gelation in the absence of the scaffold as normally occurring during aerogel formation without a scaffold.

In various examples, the second solvent can be a solvent that can dissolve the organic scaffold without changing aerogel microstructure or adverse chemical reactions, and are compatible with solvent removal stages. For example, a low-temperature extraction based on supercritical extraction of $CO_2$ can use alcohols, acetone or other solvents that are non-polar and soluble in the $CO_2$ within aerogel pores (e.g. sufficiently similar critical pressure to $CO_2$). Non-limiting examples of solvents that can be used as the second solvent include acetone, methyl ethyl ketone, methyl isobutyl ketone, methyl glycol ether, ethyl glycol ether, isopropyl glycol ether, and the like.

In further examples, the gel can be placed in the second solvent and soaked for a period of time. In some examples, the time can be from about 1 hour to about 1 week. In further examples, the time can be from about 24 hours to about 72 hours. The second solvent may be refreshed throughout the solvent exchange process by removing the used solvent and replacing it with fresh solvent. In some examples, the second solvent can be replaced from 1 to 10 times during the solvent exchange. In other examples, fresh solvent can be continuously flowed over the gel. Periodic refresh of the solvent can compensate for saturation of the solvent with dissolved scaffold material which results in reduced rate of scaffold dissolution.

After the organic scaffold has been dissolved away, the gel can be dried to remove the second solvent and form the dry aerogel. In some examples, drying can be accomplished by supercritical drying. In one example, the gel can be placed in a pressure vessel and the vessel can be filled with liquid carbon dioxide. The liquid carbon dioxide can replace the second solvent in the gel through a similar solvent exchange process as described above. For example, the liquid carbon dioxide may be replaced with fresh liquid carbon dioxide multiple times over a period of about 1 day to about 1 week. The pressure can then be released gradually above the critical point of carbon dioxide to remove the carbon dioxide from the gel without collapsing the structure of the gel. In another supercritical drying method, the gel can be placed in a pressure vessel with the second solvent. The pressure vessel can be heated and pressurized above the critical temperature and pressure of the second solvent, and the pressure can be gradually released to remove the second solvent from the gel without collapsing the structure of the gel.

In alternative examples, subcritical drying can be used to dry the gel. In many cases, subcritical drying can result in a denser aerogel because of partial or full collapse of the gel structure. However, some methods of subcritical drying can be used to reduce the collapse of the gel structure, such as exchanging the second solvent with a low-surface-tension solvent or chemically modifying the gel in a way that reduces capillary forces on the gel structure during drying. Other non-limiting examples of drying can include freeze drying, high or low temperature supercritical extraction, ambient pressure drying with surface modifications, and the like.

The final permeable aerogel formed using the methods described herein can have a low density characteristic of aerogels with an increased permeability due to the interconnected channel network formed by the organic scaffold. In some examples, the permeable aerogel can have a helium permeability of $1\times10^{-10}$ m$^2$ to 10 m$^2$. The permeability can be greater than aerogels formed without the interconnected channel network, which can often have permeabilities of $2\times10^{-11}$ m$^2$ or less. Accordingly, in some examples the interconnected channel network can increase the permeability of the aerogel by a factor of about 2 to about 10 or more over the same composition aerogel formed without using the removable scaffold material. Similarly, the permeable aerogels can also have very high surface areas. Although surface areas can vary depending on the specific materials and process conditions, surface areas from about 500 m$^2$/g to about 3500 m$^2$/g, and most often from 500 m$^2$/g to about 1000 m$^2$/g can be achieved.

In further examples, the permeable aerogel can include channels having an average diameter from about 0.1 micrometer to about 50 micrometers, depending on the type of organic scaffold material used. Permeable aerogels produced using the lacquer method described above can sometimes have smaller diameter channels dispersed more homogeneously throughout the volume of the aerogel. Permeable aerogels produced using organic scaffold fibers can have a smaller number of larger diameter channels. In further examples, the volume of the channel network can be from about 0.1 vol % to about 90 vol % of the geometric volume of the permeable aerogel.

Furthermore, the use of these scaffold materials can allow for careful control of porosity which can result in hierarchical porous structures. More specifically, interconnected channels can be woven through to augment intrinsic aerogel microstructure, especially when using a solid fiber scaffold approach. When a lacquer method is used, the open cell porosity resulting from the scaffold material can be more subtle and appears similar to the intrinsic structure but more open. For example, aerogel membranes formed from the lacquer method tend to have an interconnectivity that appears more as darkened areas within the finely connected silica matrix. A result of an increase in open cell porosity is that the silica matrix can become less connected. Therefore, in some cases, a combination of the methods can be used to create a more robust aerogel. For example, if a certain target gas permeability is required for a membrane used for gas filtration, but the aerogel also needs to have higher mechanical strength, then both fiber and lacquer methods can be used together to create a hierarchical open cell structure. Thus, in some cases, the sol mixture can include both a lacquer-rich phase and a solid fiber as a composite scaffold material. In such cases, the solid fiber scaffold material can have a different composition from the organic material dissolved in the lacquer (i.e. only one is soluble in the scaffold solvent at the sol mixing temperature). In some cases, the solid fiber scaffold material can have a common composition with the organic composition in the lacquer. In such cases, the lacquer can be first saturated such that the solid fiber scaffold material does not dissolve when contacted with the lacquer-rich phase. Alternatively, the lacquer-rich phase and solid fiber material can be mixed separately with the sol mixture to minimize contact between the two scaffold materials. Furthermore, although two scaffold material types are described in detail herein, more than two can also be used (e.g. three or more) as long as solubility, inertness with aerogel chemistry, and solvents are chosen as described herein. With a composite scaffold approach, controlled porosity can be achieved from nano to micron scale pore channel networks. In some cases, both micron-scale (e.g. 1 μm or greater and often 1 μm to 100 μm) channels and nano-scale (e.g. less than 1 μm) channels can be formed in a common aerogel material. Proportions of each channel size can vary based on proportions of corresponding scaffold material. For example, in some cases of a hierarchical porous structure, nano-scale channels can comprise from 5% to 85% by volume of the interconnected channels, and in some cases from 25% to 80% by volume. Similarly, micron-scale channels can be formed at from about 15% to 95% by volume, and in some cases from 30% to 80% by volume of the interconnected channels. These proportions can vary considerably depending on the desired final aerogel structure, but such hierarchical porous structures can have at least 5% and often at least 10% by volume of a minor porous structure (i.e. either micron-scale or nano-scale channels).

The permeable aerogels can be used for a variety of applications in which gases are to flow through the aerogel. For example, the permeable aerogels can be used as gas filters to remove unwanted gas components. In a specific example, the permeable aerogel can include organic side groups to make the aerogel more effective at filtering organic molecules from air. For example, such filters can be used to capture hazardous volatiles (e.g. radioactive volatile iodine), microbial contaminants, capacitive deionization, water purification, particulate removal from air, etc. In further examples, the permeable aerogels can be used in catalytic converters, disease detection (e.g. electrochemical detection of volatile breath markers), VOC detection (e.g. chemical plant leaks), tissue and bone scaffolds (e.g. facilitate cell ingrowth during bone regeneration), and shape changing aerogels (e.g. actuators).

In alternative examples, the organic scaffold can be removed by calcination instead of by exchanging a second solvent for the first solvent in the gel. In these examples, the gel can be formed then dried without soaking the gel in a second solvent. However, the gel may be aged by soaking in the first solvent. The aging process can be similar to the solvent exchange process described above, except that fresh first solvent is added instead of the second solvent. Aging in the first solvent can remove byproducts of the gelation reaction, but the organic scaffold is not dissolved by the first solvent. The gel can be dried, either by supercritical or subcritical drying, as described above to form an aerogel. The aerogel can then be calcined to remove or "burn out" the organic scaffold. This method can be useful for aerogels that are made of a material that is stable under high temperatures that are sufficient to decompose or burn the organic scaffold. However, when aerogels are formed with organic side groups then the high temperatures used during calcination can potentially damage the aerogel. Accordingly, in some examples the solvent exchange process described above can be more effective to produce permeable aerogels than the calcination process.

EXAMPLES

Permeable aerogel membranes were made using multiple methods. Some samples were made using nitrocellulose (NC) fibers as an organic scaffold. The NC fibers were removed either by dissolving in acetone during solvent exchange or by calcination after drying the aerogel. Other samples were made using a NC lacquer mixed with the sol mixture. The mixture separated into a NC-rich phase and a sol-rich phase. The NC was removed after gelation by dissolving in acetone during solvent exchange. The precursors used to make the aerogels included tetraethoxysilane (TEOS) and methyltriethoxysilane (MTES). The samples were prepared using the following specific ingredients and procedures.

Sulfuric acid ACS Plus Grade (98%, Fisher Scientific), nitric acid ACS Plus Grade (68%-70%, Fisher Scientific), and organic cotton (365 Organic) were used to prepare the nitrocellulose fibers. Tetraethyloxysilane (TEOS; >98%, Alfa Aesar) and ammonium fluoride (97+%, Alfa Aesar), acetone (99.5%, Fisher Scientific), ammonium hydroxide (28%, Anachemia), and anhydrous ethanol (200 proof, Decon Laboratories) were used to prepare aerogels. A silica-based gel with an organic modification to enhance strength and hydrophobicity was prepared using methyltriethoxysilane (MTES; 96%, Acros Organics).

NC was formed by nitrating cellulose (raw cotton) in a 40° C. mixture of 75 mL sulfuric acid and 25 mL nitric acid. During this reaction, sulfuric acid acts as both a catalyst and as a desiccant by removing $H_2O$ from the reaction and providing $H^+$ to the $HNO_3$ to generate the active nitrating agent, $NO_2^+$. Cellulose weighing ca. 0.4 g was placed in the nitration solution and allowed to react for various time periods between 10-60 min (NC10-NC60). NC10 was the shortest nitration time period used in the study, as below this level, the NC burned like the original cotton source and had very limited solubility in acetone. After nitration, the NC was washed in a bath of chilled deionized (DI) water. The NC was washed for a total of 15 mins with a complete water replacement occurring every 5 min. Calcium carbonate was added to the final bath to ensure neutralization of excess acid. The NC was dried at 60° C. for 12 hrs in a drying oven located in a fume hood. As NC is prone to spontaneous combustion, the NC was used immediately after the drying period, to eliminate the need for storage.

Sol-gels were made using either the alkoxysilane precursor TEOS or TEOS with a 25 vol % replacement of the alkylalkoxysilane, MTES. In both cases, a total of 7 mL of the desired precursor solution was mixed with 11 mL of anhydrous ethanol. A second solution was prepared by mixing 11 mL of anhydrous ethanol, 3 mL of deionized water, 0.0102 mL of ammonium hydroxide, and 0.0246 g of ammonium fluoride. These solutions were mixed using a vortex mixer for 30 s and the NC scaffold was introduced into the gel as fibers or as a lacquer. In the fiber method, once the precursor sol solution was mixed, 1 mL was poured into a 0.8 cm diameter mold containing 20 mg of NC fibers. In the lacquer method, 25 mg of NC was dissolved in 1 ml acetone, creating the NC lacquer that was added to 1-3 mL of sol and vortexed for 1 min. The resulting mixture was then poured into a 1 cm diameter mold. The experimental details for preparation of the aerogel membranes fabricated using the NC-A lacquer method are listed in Table 1.

TABLE 1

Experimental details for preparation of the NC-A aerogel samples. The aerogels made only with TEOS are designated with a T, and those that contain 25 vol % MTES are designated with an M. The number in the sample designation (e.g., T-25) indicates the volume percent of NC-A lacquer mixed with the precursor sol solution to make the aerogel membranes.

| Sample | Volume percent of NC-A lacquer (%) | Volume percent precursor (%) | |
|---|---|---|---|
| | | TEOS | MTES |
| T-0 | 0 | 21.9 | 0.0 |
| T-25 | 25 | 16.4 | 0.0 |
| T-33 | 33 | 14.6 | 0.0 |
| T-50 | 50 | 10.9 | 0.0 |
| M-0 | 0 | 16.4 | 5.5 |
| M-25 | 25 | 12.3 | 4.1 |
| M-33 | 33 | 10.9 | 3.6 |
| M-50 | 50 | 8.2 | 2.7 |

Gels were allowed to set before demolding. After demolding, the gels were immediately placed into either anhydrous ethanol or acetone. The gels aged in the solvent for 72 hrs in total, with the solvent being drained and replaced every 18 hrs. The aged alcogels were loaded into a supercritical drying chamber where solvent exchanges with liquid $CO_2$ were performed over 72 hrs with a $CO_2$ replacement every 18 hrs. The chamber was heated to 45° C. and held at 120 bar for 10 min. The pressure was released at a rate of 5 kbar/hr until the chamber reached 35 bar and then vented at 10 kbar/hr to ambient pressure. Aerogels in which the gel solvent exchange had in occurred only in ethanol were then calcined at 225° C. in either air or oxygen for 5 min.

Scanning electron microscopy (SEM; Hitachi S-4800) was used to examine the physical structure of the aerogels. Aerogels were cut in half and mounted to examine the reticulated channels. The structure of the nitrocellulose after various nitration times was examined using Fourier transform infrared spectroscopy (FTIR; Thermo Fisher Nicolet iS50) near infrared spectroscopy (NIR; Hitachi U-4100). The skeletal volume was determined helium pycnometry (GPYC; Micromeritics AccuPyc II 1340). The closed porosity was calculated from the results of helium pycnometer using the following expression (Equation 2):

$$\Pi = \frac{\rho_s - \rho_b}{\rho_s} \times 100\% \qquad (2)$$

where $\Pi$ is the porosity, $\rho_b$ is the bulk density obtained from the mass and volume of three representative samples and $\rho_s$ is the skeletal density determined from helium pycnometry results on those same samples. The percent volume shrinkage (% $V_s$) was calculated based on volumes of the alcogels and corresponding aerogels after supercritical drying using Equation 3:

$$\% \ V_s = (1 - V_{aerogel}/V_{alcogel}) \qquad (3)$$

Figure 12:
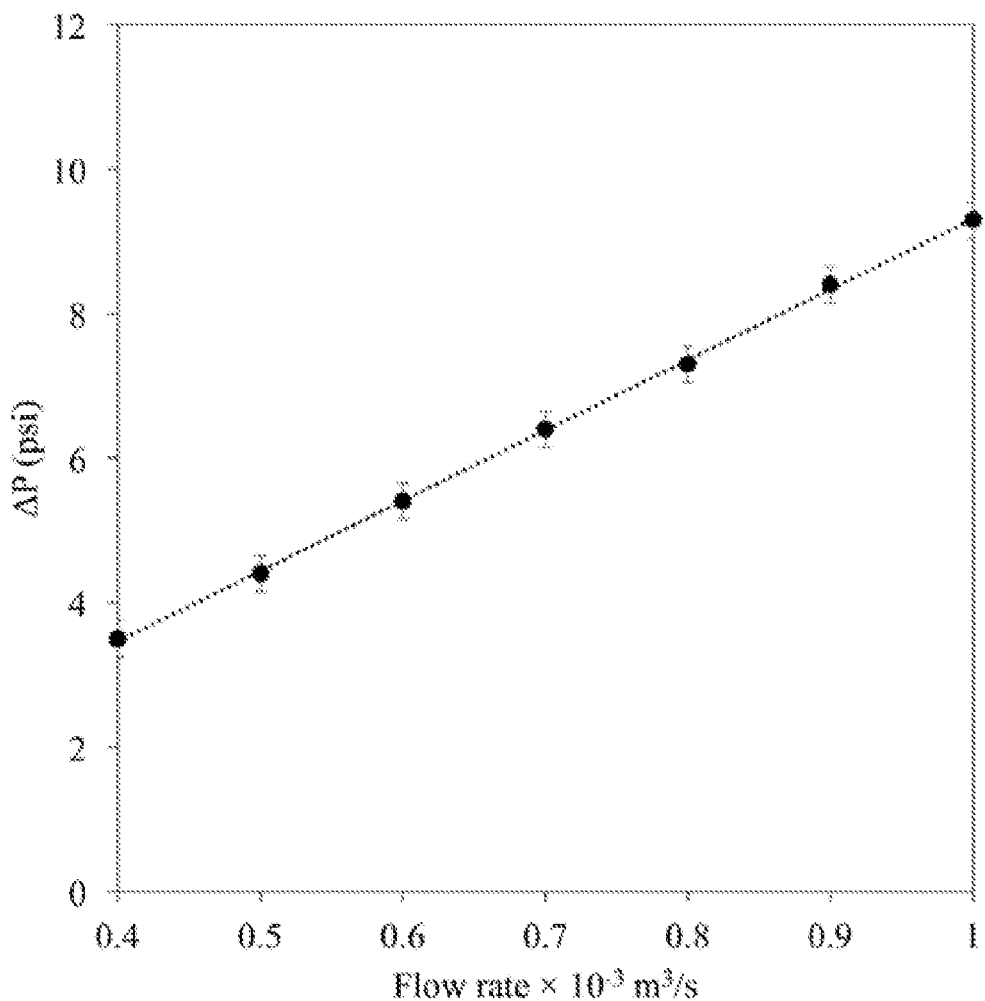
FIG. 12 is a graph of the flow rate of helium through a sample permeable aerogel vs. pressure difference in accordance with examples of the present disclosure.

Steady state gas flow measurements were performed using an apparatus that included a helium gas cylinder, a gas controller, a membrane holder for holding each aerogel membrane, and a flow meter to measure the flow coming through the aerogel. Vacuum grease and hot melt adhesive were used to seal the aerogel into the membrane holder. The inner chamber of the holder was adjusted to accommodate for aerogel shrinkage if needed. The aerogel ends were shaved down to produce flat surfaces. The flow was manually adjusted to incrementally increase the inlet face pressure using the gas controller (Alicat MCRQS 100SLPM-D Controller), and the flow meter (Alicat MQS 100SLPM-D Mass Flowmeter) was used to record the resulting pressure drop through the sample. FIG. 12 shows a set of representative data on a sample of differential pressure versus gas flow rate. Plots like this were collected for each sample with gas face velocities of up to $1 \times 10^{-3}$ m$^3$/s (the maximum for the digital meter). Three different samples of each composition were tested and the average values were reported. The sample was allowed to come into equilibrium with the test gas flow before the pressure drop was recorded. The slope of this graph was then used to calculate the membrane permeability using Darcy's law (Equation 1, given above). The linearity indicates that the flow properties did not change with increasing differential pressure (i.e., no deformation of the aerogel sample).

The structure of the aerogels prepared as described above was dependent upon the alkoxide and organosilane precursors, NC scaffold (i.e., fiber or lacquer), and the solvent used during the initial solvent exchange process. Direct incorporation of NC fibers into the sol produced aerogels with interconnected channels of ten of microns (10-50 micrometers), while mixing an NC lacquer with the sol created aerogels with a highly open scaffold.

Figure 13A:
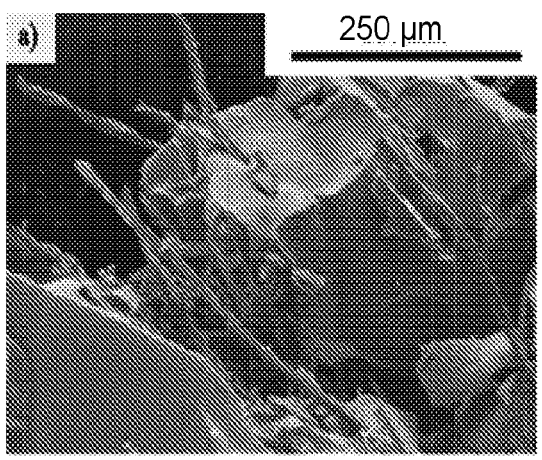
FIG. 13A-E shows SEM images of example permeable aerogels in accordance with examples of the present disclosure.
Figure 13B:
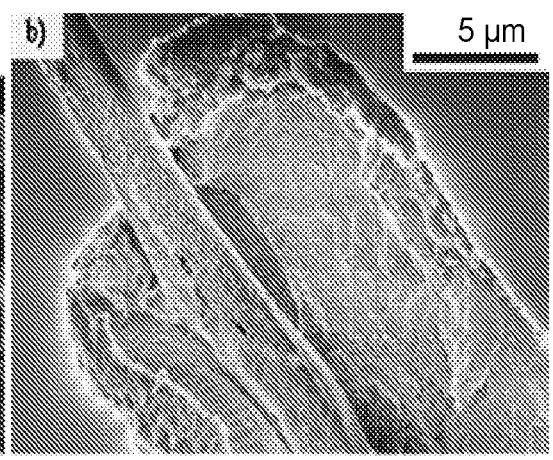
Figure 13C:
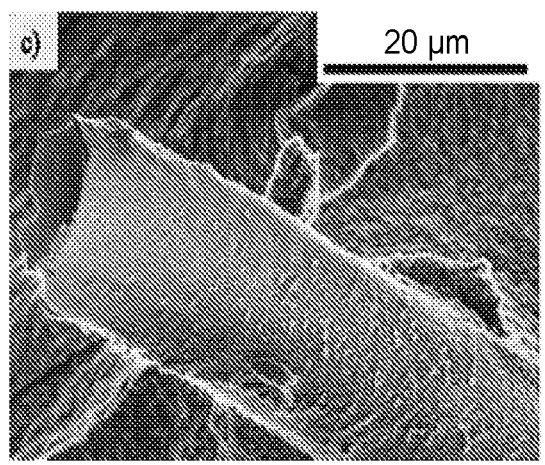
Figure 13D:
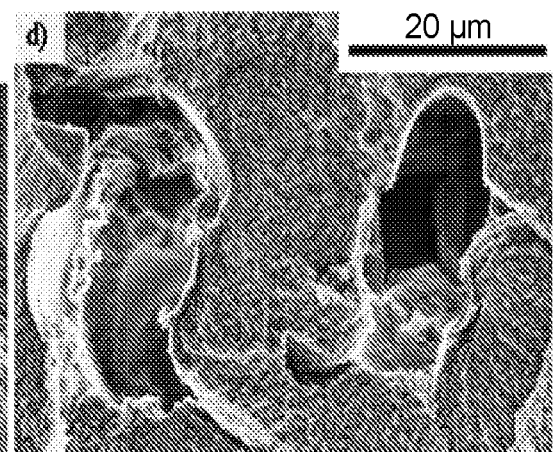
Figure 13E:
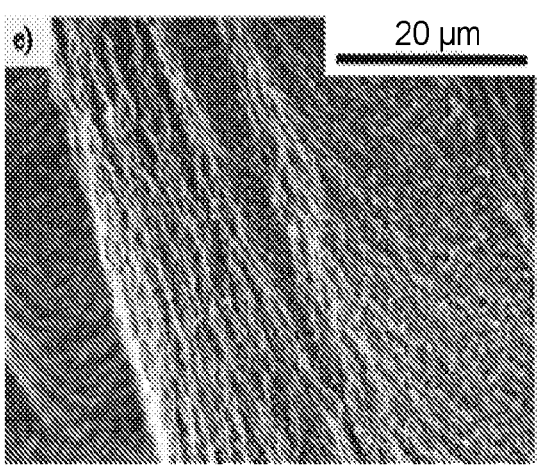

The aerogel membranes including MTES appeared slightly opaquer than the TEOS membranes, but both exhibited the same behavior with scaffold removal. FIG. 13A-E shows the results from TEOS membranes. Calcining in air or oxygen (FIG. 13a) had no visible effect on the aerogel membranes containing cellulose. The NC10 aerogel membranes still had fibers in the channels after calcining in air (FIG. 13b); however, fewer fibers were observed after calcining in oxygen and all the fibers that were present had a smaller diameter than those calcined in air. Aerogel membranes containing NC nitrated for 20 min (NC20) were similar, showing some thin fibers after calcination in air but no visible fibers or carbon residue after calcining in oxygen (FIGS. 13c and 13d). The channel after scaffold removal showed the same texture as the surrounding aerogel (FIG. 13e). The fibers remaining in the NC10 calcined in air (NC10-air) were visually apparent as a dark residue, while the sample calcined in oxygen (NC10-oxygen) showed no residue. With front illumination, the sample looked similar to the classic aerogel with channels only appearing obvious in back lighting.

The calcining method of removing the NC fibers was found to be inconsistent and often left residual fibers or residue or caused structural damage to the aerogel. Combustion of the NC produces gases and elevates the local temperature, both of which can lead to structural collapse of parts of the membrane. This was not an issue with the aerogels made using solvent exchange to remove the organic scaffold.

Figure 14A:
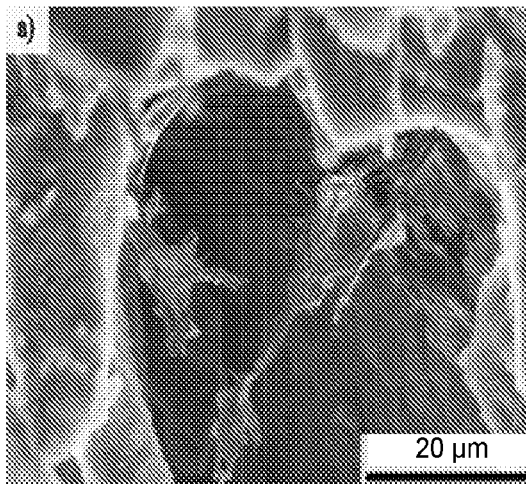
FIG. 14A-D shows more SEM images of example permeable aerogels in accordance with examples of the present disclosure.
Figure 14B:
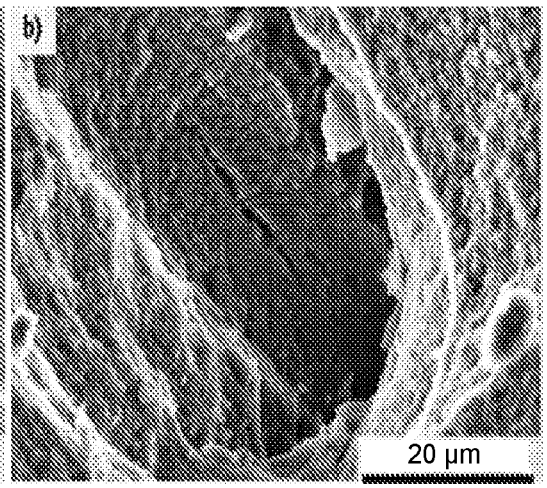
Figure 14C:
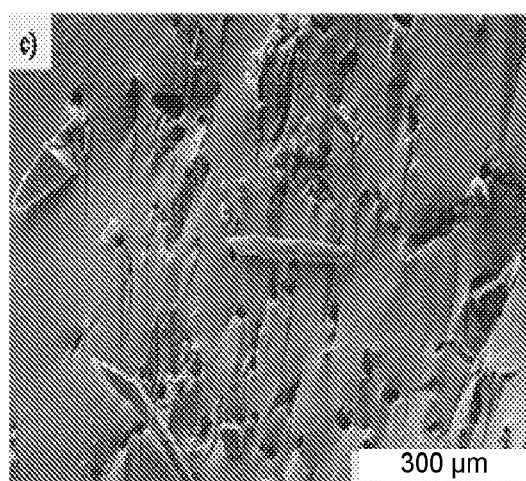
Figure 14D:
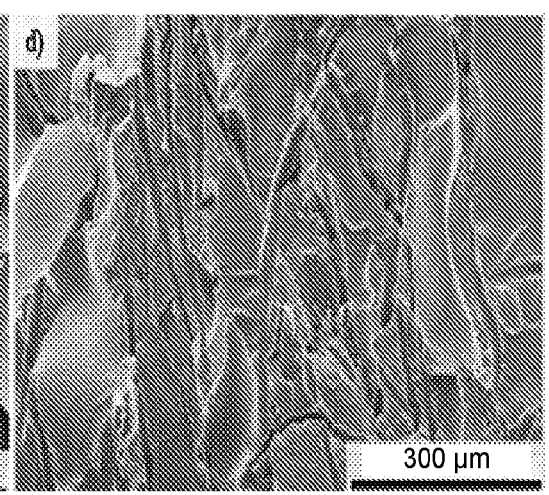
Figures 15A, 15B, 15C:
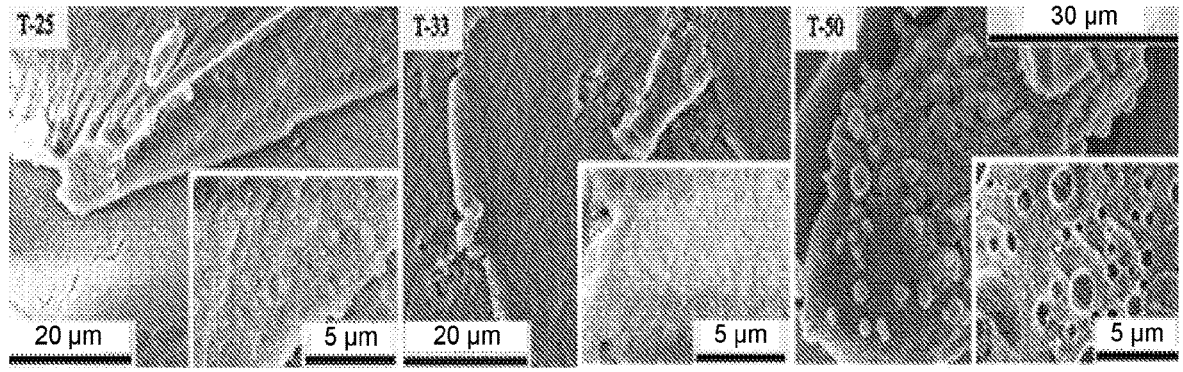
FIG. 15A-F shows more SEM images of example permeable aerogels in accordance with examples of the present disclosure.
Figures 15D, 15E, 15F:
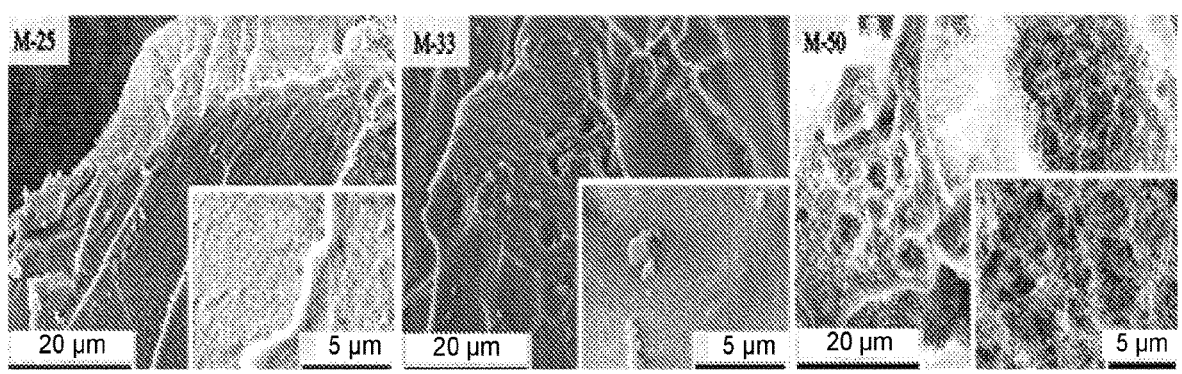

FIG. 14A-D shows 25MTES membranes produced using solvent exchange to dissolve NC fibers in acetone. Membranes containing the NC10 still had fibers present after supercritical drying, while only small fiber remnants remained with NC30 due to its higher solubility (FIG. 14a). Calcining at 225° C. in air produced no visible change in the sample, indicating that any residual fiber would be cellulose and not NC. The presence of cellulose was confirmed after subsequent calcining at 500° C. in air caused the samples to have black or brownish areas. Residuals could be removed without residue by calcining in oxygen at 500° C. Membranes formed with the NC60 displayed complete solubility in the acetone, showing no fibers in the channels after supercritical drying. Membranes with NC60 showed no visible color change after calcining at 500° C. in air, indicating that little to no cellulose was present in the structure. The channels of these membranes looked similar to the ethanol exchanged membranes; however, the lining of the channels appeared more compact than the bulk structure (FIG. 14b). FIGS. 14c and 14d show the distinct channels of the membrane from the top and side after the removal of the fibers.

Aerogel membranes produced using the NC-A lacquer method with TEOS and 25MTES are shown in FIG. 15A-F. Both T-25 and M-25 samples had microstructures similar to the parent aerogels made without lacquer. At T-33 and M-33, the microstructures appeared slightly less compact and had micron sized pits present in the bulk. For M-33, spheres of similar dimensions to the pits were also present. A drastic change in microstructure was observed for T-50 and M-50. For the T-50, the bulk microstructure appeared more open with a high density of pits. Spheres with a microstructure similar to the bulk were found embedded within the bulk aerogel, as well as in small, isolated clumps. The M-50 had an open, web-like structure that appeared to have very fine (submicron) interconnected porosity throughout the bulk scaffold. Pitting was also noticeable but very few spheres were observed. The structure of the M-50 also appeared more homogeneous than that of T-50.

Differences in microstructure are likely a direct result of the dilution of the sol precursor, which retards the hydrolysis and condensation reactions. The retardation of these reactions was directly observed by changes in the time it took the gels to become ridged enough for supercritical drying. T-0 and M-0 aerogels gelled in 5 min and 20 min, respectively. However, as the NC-A lacquer was added, the drying time went from about 10 hrs for the T-25 and M-25 to about 28 hrs for the T-50 and M-50. A ridged gel could not be formed from any TEOS- or 25MTES-based gels with more than 50 vol % NC-A lacquer. Secondly, despite the fact that formation of NC fibers was not observed upon the addition of the NC-A lacquer to the sol, the pore formation can be explained only by NC templating. While NC is soluble in acetone, it is not soluble in ethanol and water, as discussed above. Thus, when NC-A lacquer is used, it is reasonable to suggest that NC forms fine scale precipitation, which produces the interconnected pores upon gelation.

The difference in appearance between the TEOS and 25MTES membranes is a result of the chemistry of the precursor sol. Each TEOS molecule contains four hydrolysable —$OC_2H_5$ groups that link to make a highly connected 3D network. The appearance of the spherical particles is thought to be a combination of the basic environment, which encourages nucleation and growth followed by ripening, and the addition of the lacquer, which leads to isolation of the alkoxides during hydrolysis and condensation, in turn causing the spherical particles to form. For aerogels made with the 25MTES precursor, one of the hydrolysable —$OCH_2CH_3$ groups on the silicon atom is replaced with a non-hydrolysable —$CH_3$, inhibiting the hydrolysis and condensation reactions, and slowing gel times. This non-hydrolysable —$CH_3$ may cause the appearance of the spherical particles at a lower NC-A lacquer amount than the TEOS (M-33 compared to T-50) and is also responsible for the fine chain-like structure of the M-50. Introducing alkyl groups into silica precursors has a significant effect on the morphology of the resulting products, particularly during the particle formation.

Figure 16:
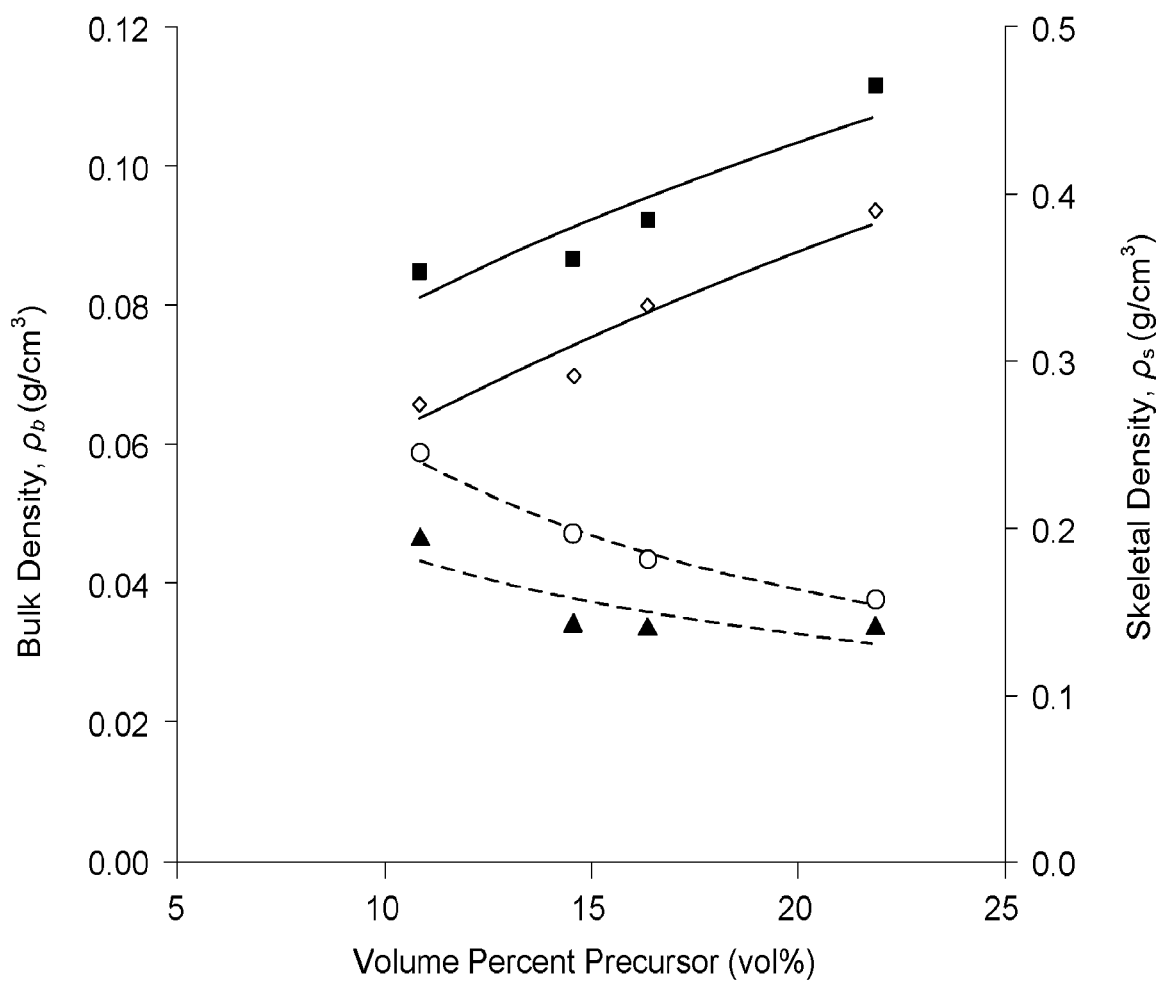
FIG. 16 is a graph of bulk density and skeletal density of example permeable aerogels vs. volume percent of the aerogel precursor used in the sol mixture, in accordance with examples of the present disclosure.

Table 2 shows the microstructural properties of the aerogels made using the NC-A lacquer method. For the TEOS and 25MTES samples the bulk density increases with increasing concentrations of NC-A lacquer due to the sample shrinkage. The addition of the NC-A lacquer reduces the amount of precursor available to develop the silica network structure. This effect, shown in FIG. 16, is seen with the decrease in skeletal density. FIG. 16 is a graph of the bulk density (left y-axis and dashed lines on graph) and skeletal density (right y-axis and solid black lines on graph) of TEOS samples (hollow circles and diamonds on graph) and 25MTES samples (solid black triangles and squares on graph), vs. volume percent of the aerogel precursor in the sol mixture. The precursor chemistry also influenced dimensional changes after supercritical drying of the sol-gel. The T-0 exhibited no measureable reduction in volume, while the M-0 showed a uniform volumetric reduction of 27%. Overall, the 25MTES samples showed 27-37% shrinkage while the TEOS samples shrunk ≤11%. The larger shrinkage of the MTES is due to the —$CH_3$ group, which effectively reduces the number of Si—O bonding centers on each Si atom, leading to a decrease in connectivity of the silica-structure. Once the percent shrinkage was determined, the molds and volume of sol-gel used to make each sample was adjusted to account for the shrinkage, so that each sample would have similar dimensions for the microstructure characterization tests shown in Table 2.

TABLE 2

Micro structure properties of the pure TEOS and MTES aerogels, and the sol to NC-A lacquer membranes. Error on closed porosity <0.1% in the reported values.

| Sample | Bulk density, $\rho_b$ (g/cm³) | Skeletal density, $\rho_s$ (g/cm³) | Shrinkage (%) | Closed porosity (%) | He permeability ($\times 10^{-10}$ m²) |
|---|---|---|---|---|---|
| T-0 | 0.0378 ± 0.0005 | 0.3903 ± 0.0010 | 0 ± 0 | 90 | 1.940 ± 0.005 |
| T-25 | 0.0436 ± 0.0001 | 0.3333 ± 0.0002 | 11 ± 3 | 87 | 3.918 ± 0.024 |
| T-33 | 0.0472 ± 0.0002 | 0.2915 ± 0.0003 | 7 ± 3 | 84 | 5.104 ± 0.015 |
| T-50 | 0.0588 ± 0.0002 | 0.2743 ± 0.0002 | 3 ± 3 | 79 | 8.433 ± 0.077 |
| M-0 | 0.0340 ± 0.0003 | 0.4653 ± 0.0006 | 27 ± 3 | 93 | 2.503 ± 0.012 |
| M-25 | 0.0340 ± 0.0002 | 0.3848 ± 0.0003 | 37 ± 3 | 91 | 4.511 ± 0.146 |
| M-33 | 0.0343 ± 0.0003 | 0.3616 ± 0.0006 | 33 ± 3 | 91 | 5.705 ± 0.018 |
| M-50 | 0.0469 ± 0.0004 | 0.3537 ± 0.0008 | 29 ± 3 | 87 | 12.122 ± 0.022 |

Figure 17:
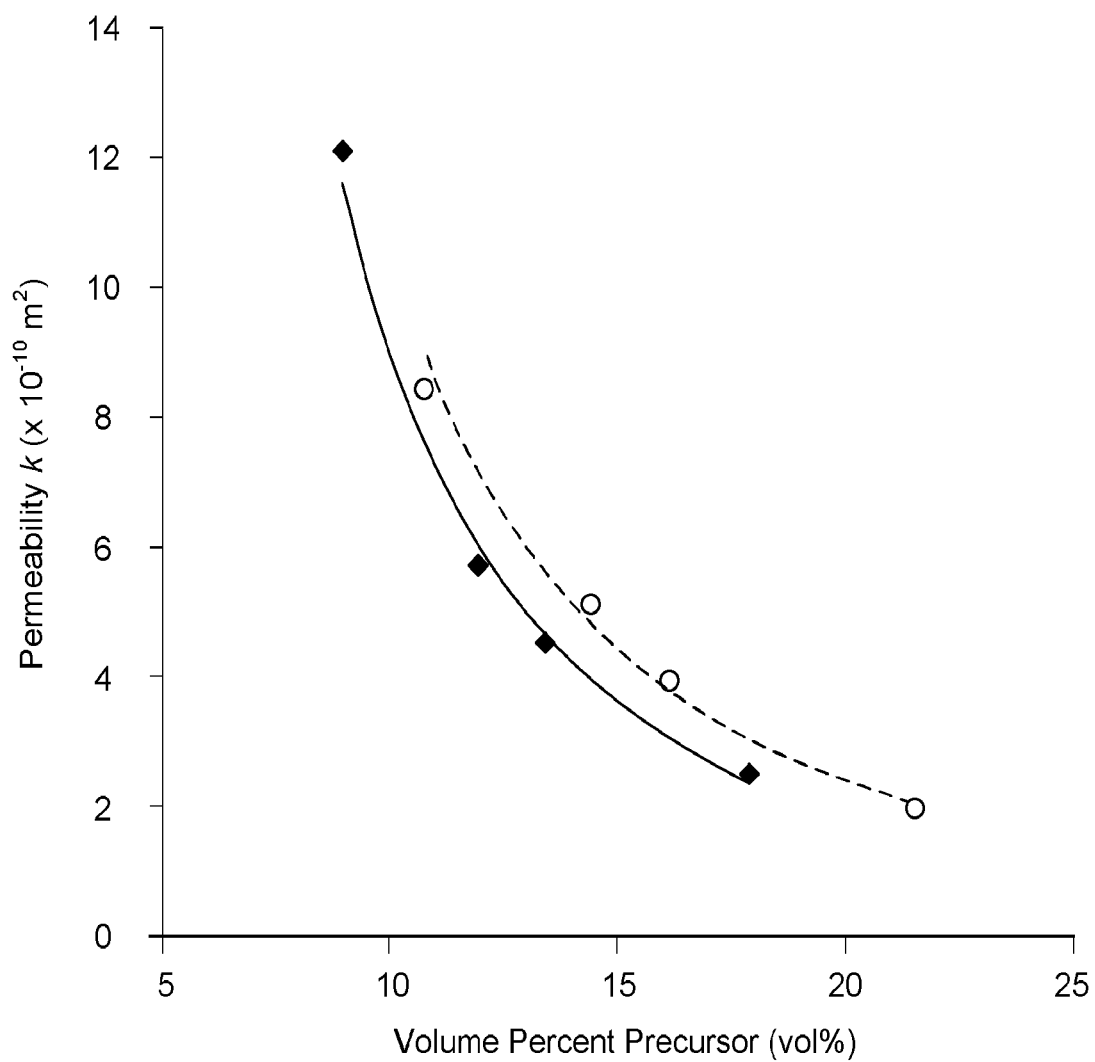
FIG. 17 is a graph of permeability of example permeable aerogels vs. volume percent of the aerogel precursor used in the sol mixture, in accordance with examples of the present disclosure.

The calculated permeability values (Table 2) of both the TEOS and 25MTES samples show an increase in permeability with increasing NC-A content. FIG. 17 shows that the permeability data followed a power-law relationship with the density and permeability (Equation 4). FIG. 17 is a graph of permeability vs. volume percent aerogel precursor in the sol mixture for TEOS samples (hollow circles and dashed line on graph) and 25MTES samples (solid black diamonds and solid black line on graph).

$$k = (av)^{-b} \qquad (4)$$

The performance of these materials aligned with the trend in percent closed porosity and the SEM microstructure observations. The TEOS and MTES samples showed similar permeability values except for the T-50 and M-50. In this case, the thin, web-like structure of the M-50 provided a greater permeability than the dense, large pitted structure observed with the T-50. If these membranes were to be used in a filtration application, the structure exhibited by the M-50 would be more desirable both due to the higher permeability and the consistency in structure compared to the T-50.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:
1. A method of making a permeable aerogel, comprising:
providing a sol mixture comprising an organic scaffold, an inorganic aerogel precursor, and a first solvent, wherein the organic scaffold is insoluble in the first solvent;
reacting the sol mixture to form a gel such that an interconnected channel network is formed which is at least partially defined by the organic scaffold;

exchanging the first solvent in the gel with a second solvent, wherein the second solvent dissolves at least a portion of the organic scaffold to expose the interconnected channel network; and drying the gel to form the permeable aerogel, wherein at least one of:

the organic scaffold is formed by dissolving an organic material in a scaffold solvent to form a lacquer, and mixing the lacquer into the sol mixture such that the sol mixture separates into a lacquer-rich phase and a sol-rich phase, the lacquer-rich phase being the organic scaffold;

the organic scaffold is formed by mixing solid fibers of an organic material into the sol mixture;

the organic scaffold is a composite organic scaffold formed by mixing solid fibers of a first organic material into the sol mixture; and dissolving a second organic material in a scaffold solvent to form a lacquer; and mixing the lacquer into the sol mixture such that the sol mixture separates into a lacquer-rich phase and a sol-rich phase;

the organic scaffold comprises 40% to 70% of the sol mixture by volume; and the sol mixture further comprises a basic catalyst to gelate the inorganic aerogel precursor.

2. The method of claim 1, wherein the organic scaffold is chemically inert with respect to the inorganic aerogel precursor and the gel.

3. The method of claim 1, wherein the scaffold solvent comprises the second solvent.

4. The method of claim 1, wherein the lacquer-rich phase comprises a solid precipitate of the organic material.

5. The method of claim 1, wherein the organic scaffold is present in an amount from 5 g/L to 50 g/L with respect to the entire volume of the sol mixture.

6. The method of claim 1, wherein the organic scaffold comprises at least one of nitrocellulose, polystyrene, acrylonitrile butadiene styrene, polycarbonate, tosylamide/formaldehyde resin, polyvinyl chloride, nitrile, polyester, polyethylene, and silicone.

7. The method of claim 1, wherein the first solvent comprises ethanol, methanol, isopropyl alcohol or combinations thereof.

8. The method of claim 1, wherein the second solvent comprises acetone, methyl ethyl ketone, methyl isobutyl ketone, methyl glycol ether, ethyl glycol ether, isopropyl glycol ether, or combinations thereof.

9. The method of claim 1, wherein the inorganic aerogel precursor includes a silicon alkoxide, a metal alkoxide, a metal salt, tetraethoxysilane, tetramethoxysilane, methyltriethoxysilane, sodium silicate, aluminum alkoxide, aluminum nitrate, aluminum chloride, titanium alkoxide, titanium nitrate, titanium chloride, zirconium nitrate, zirconium chloride, zirconium alkoxide, hafnium nitrate, hafnium chloride, hafnium alkoxide, niobium nitrate, niobium chloride, niobium alkoxide, tantalum nitrate, tantalum chloride, tantalum alkoxide, chromium nitrate, chromium chloride, chromium alkoxide, tungsten nitrate, tungsten chloride, tungsten alkoxide, iron nitrate, iron chloride, iron alkoxide, indium nitrate, indium chloride, indium alkoxide, gallium nitrate, gallium chloride, gallium alkoxide, tin nitrate, tin chloride, tin alkoxide, bismuth nitrate, bismuth chloride, calcium nitrate, calcium chloride, sodium chloride, sodium nitrate, potassium chloride, potassium nitrate, silver chloride, silver nitrate, copper chloride, copper nitrate, cobalt chloride, cobalt nitrate, or combinations thereof.

10. The method of claim 1, wherein the inorganic aerogel precursor includes a compound having an organic side group.

11. The method of claim 1, wherein the inorganic aerogel precursor is 75 vol % tetraethoxysilane and 25 vol % methyltriethoxysilane.

12. The method of claim 1, wherein the basic catalyst comprises ammonium hydroxide, sodium hydroxide, sodium carbonate, potassium carbonate, or combinations thereof.

13. The method of claim 1, wherein drying is accomplished under supercritical drying conditions.

14. The method of claim 13, wherein the supercritical drying conditions comprise exchanging the second solvent in the gel with supercritical carbon dioxide.

15. The method of claim 1, wherein the permeable aerogel has a permeability of $5 \times 10^{-10}$ m$^2$ to $2 \times 10^{-4}$ m$^2$.

16. The method of claim 1, wherein the interconnected channels have an average diameter from 0.1 micrometer to 50 micrometers.

* * * * *